United States Patent …
Shozakai et al.

(10) Patent No.: US 7,440,891 B1
(45) Date of Patent: Oct. 21, 2008

(54) SPEECH PROCESSING METHOD AND APPARATUS FOR IMPROVING SPEECH QUALITY AND SPEECH RECOGNITION PERFORMANCE

(75) Inventors: Makoto Shozakai, Atsugi (JP); Tomohiro Tani, Atsugi (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/380,563

(22) PCT Filed: Mar. 5, 1998

(86) PCT No.: PCT/JP98/00915

§ 371 (c)(1), (2), (4) Date: Sep. 3, 1999

(87) PCT Pub. No.: WO98/39946

PCT Pub. Date: Sep. 11, 1998

(30) Foreign Application Priority Data

Mar. 6, 1997 (JP) ............................... 9-051577

(51) Int. Cl.
G10L 15/20 (2006.01)
G10L 21/02 (2006.01)

(52) U.S. Cl. ............................... 704/233; 704/226
(58) Field of Classification Search ............... 704/233, 704/231, 226–228; 370/290; 381/406
See application file for complete search history.

(56) References Cited

U.S. PATENT DOCUMENTS

| 5,276,765 A |   | 1/1994  | Freeman et al. |         |
|-------------|---|---------|----------------|---------|
| 5,463,618 A | * | 10/1995 | Furukawa et al.| 370/290 |
| 5,475,791 A | * | 12/1995 | Schalk et al.  | 704/233 |
| 5,655,057 A | * | 8/1997  | Takagi         | 704/233 |
| 5,742,694 A | * | 4/1998  | Eatwell        | 381/94.2|
| 6,001,131 A | * | 12/1999 | Raman          | 704/226 |
| 6,263,307 B1| * | 7/2001  | Arslan et al.  | 704/226 |
| 6,539,352 B1| * | 3/2003  | Sharma et al.  | 704/249 |

FOREIGN PATENT DOCUMENTS

| EP | 0 454 242 A1 | 10/1991 |
| EP | 0 637 012 A2 | 2/1995  |
| EP | 0 731 593 A2 | 9/1996  |
| JP | 56-029296    | 3/1981  |
| JP | 58-198097    | 11/1983 |

(Continued)

OTHER PUBLICATIONS

Rahim et al, "Signal Conditioning Techniques for Robust Speech Recognition," IEEE Signal Processing Letters, vol. 3, Issue 4, Apr. 1996, pp. 107-109.*

(Continued)

Primary Examiner—Angela A Armstrong
(74) Attorney, Agent, or Firm—Finnegan, Henderson, Farabow, Garrett & Dunner, LLP

(57) ABSTRACT

A speech processing apparatus which, in the process of performing echo canceling by using a pseudo acoustic echo signal, continuously uses an impulse response used for the previous frame as an impulse response to generate the pseudo acoustic echo signal when a voice is contained in the microphone input signal, and which uses a newly updated impulse response when a voice is not contained in the microphone input signal.

8 Claims, 20 Drawing Sheets

FOREIGN PATENT DOCUMENTS

| | | |
|---|---|---|
| JP | 09-258772 | 3/1987 |
| JP | 63-18797 | 1/1988 |
| JP | 2-244096 | 9/1990 |
| JP | 2-107236 | 1/1992 |
| JP | 4-230798 | 8/1992 |
| JP | 5-67244 | 3/1993 |
| JP | 05-102887 | 4/1993 |
| JP | 05-213946 | 3/1995 |
| JP | 7-66757 | 3/1995 |
| JP | 07-0098599 | 4/1995 |
| JP | 07-303066 | 11/1995 |
| JP | 08-050499 | 2/1996 |
| JP | 08-123465 | 5/1996 |
| JP | 10-105191 | 4/1998 |
| JP | 09-051577 | 9/1998 |
| JP | 09-056018 | 9/1999 |
| WO | WO 95/06382 | 3/1995 |
| WO | WO 96/42142 | * 12/1996 |

OTHER PUBLICATIONS

Picone et al, "Enhancing the Performance of Speech Recognition with Echo Cancellation," ICASSP-88, Int. Conf. on Acoustics, Speech and Signal Processing, pp. 529-532, vol. 1.*

Gupta et al, "High Accuracy Connected Digit Recognition for Mobile Applications", ICASSP-96, Int. Conf. on Acoustics, Speech and Signal Processing, pp. 57-60, vol. 1.*

Flores et al, "Continuous Speech Recognition in Noise Using Spectral Substraction Adaptation," ICASSP-94, Int. Conf. on Acoustics, Speech and Signal Processing, pp. I/409-I/412, vol. 1.*

Parsons, T, Voice and Speech Processing, 1987, pp. 203-205.*

Parsons, T., Voice and Speech Processing, 1987, pp. 203-205.*

O'Shaughnessy, D., Speech Communication: Human and Machine, pp. 229-231.*

Japanese Office Action dated Apr. 17, 2001.

EPO Search Report dated Jan. 24, 2005, for EP 98 90 5778.

Japan Patent Office, Official Notice of Rejection regarding Japan Patent Application No. 9-056018, Jan. 31, 2007.

Japan Patent Office, Official Notice of Rejection regarding Japan Patent Application No. 9-056018, Feb. 2, 2007.

Huang, X., et al., "Microsoft Windows Highly Intelligent Speech Recognizer: Whisper," 1995 International Conference on Acoustics, Speech, and Signal Processing, May 9-12, 1995, pp. 93-96, vol. 1, Detroit, MI.

Japan Patent Office, Official Notice of Rejection regarding Japan Patent Application No. 9-056018, Mar. 7, 2006, 3 pages.

S. Makino et al., "Exponentially Weighted Stepsize NLMS Adaptive Filter Based on the Statistics of a Room Impulse Response," IEEE Trans. SAP, vol. 1, No. 1, pp. 101-108, 1993.

A. Acero, "Acoustical and Environmental Robustness in Automatic Speech Recognition," Kluwer Academic Publishers, 1992.

Y. Chen, "Cepsral Domain Talker Stress Compensation for Robust Speech Recognition," IEEE Trans. ASSP, vol. 36, No. 4, pp. 433-439.

J.H.L. Hansen et al., "A Source Generator Based Production Model for Environmental Robustness in Speech Recognition," Proc. ICSLP 94, Japan, pp. 1003-1006, 1994.

M. Shozakai et al., "A Non-Iterative Model-Adaptive E-CMN/PMC Approach for Speech Recognition in Car Environments," Proc. Eurospeech, Greece, pp. 287-290, 1997.

* cited by examiner

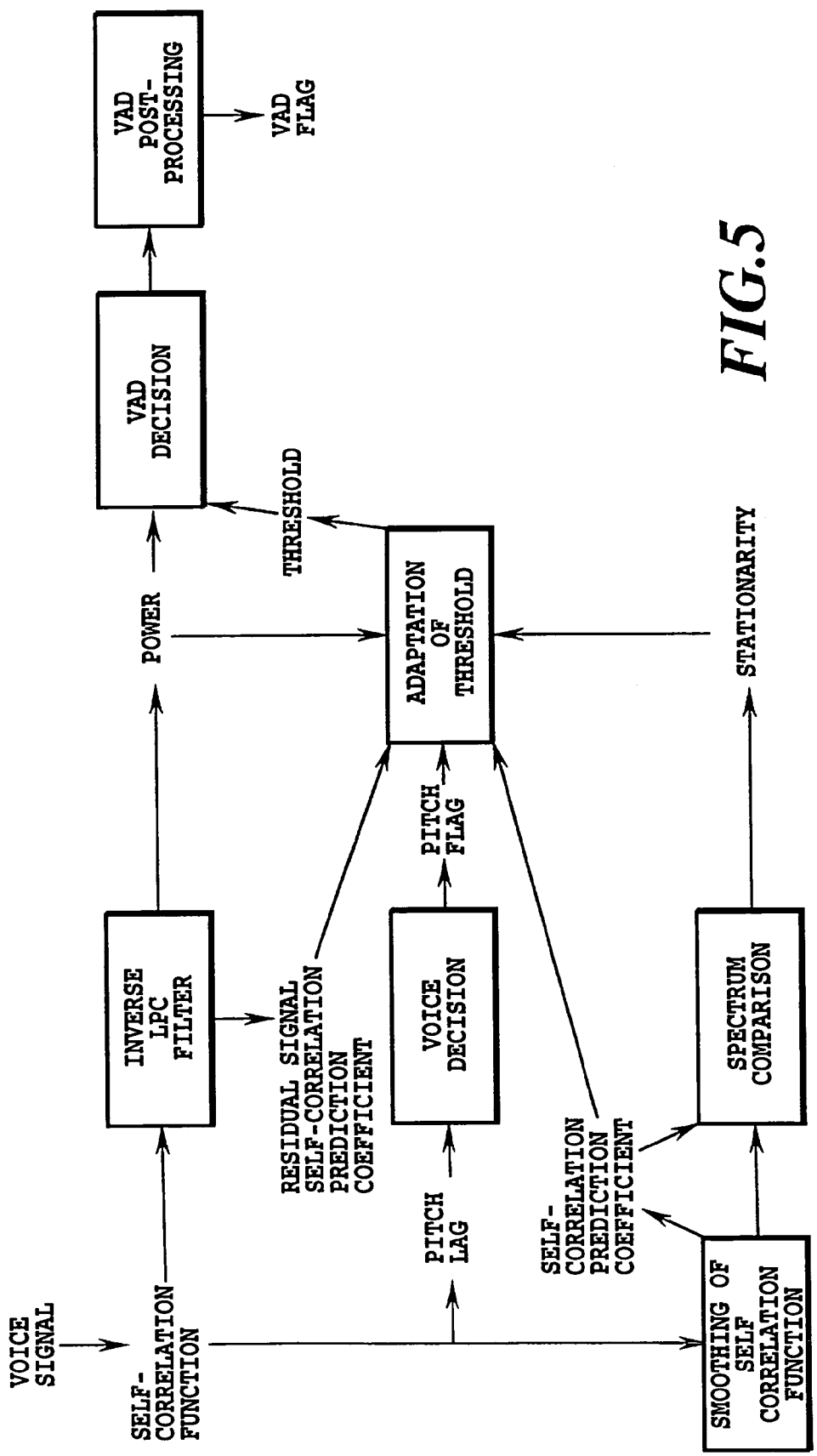

US 7,440,891 B1

SPEECH PROCESSING METHOD AND APPARATUS FOR IMPROVING SPEECH QUALITY AND SPEECH RECOGNITION PERFORMANCE

FIELD OF THE INVENTION

The present invention relates to a speech processing apparatus and method that is applicable to hands-free communication systems (teleconferencing systems, car phones, etc.) which cancel acoustic echoes from a remote speaker to a remote microphone for improving a speech quality, and also applicable to hands-free speech recognition apparatus (car audios, car navigations, PCs, etc.) that cancel voice running around from a remote speaker to a remote microphone for improving a speech recognition performance.

DESCRIPTION OF THE PRIOR ART

An acoustic signal running around from a remote speaker to a remote microphone is often called an acoustic echo. The technology for eliminating such acoustic echoes (acoustic echo canceler) has two uses as listed below.

1) In the hands-free communication systems (teleconferencing systems and car phones), this technology improves the quality of voice of a person engaged in conversation that is transmitted over communication line.

The voice of a talker on the other end of the line output from a remote speaker may be reflected by a wall or window glass in the room and, under the influence of the acoustic characteristic of the room, get into a remote microphone. In this case, the talker on the other end of the line hears his or her own voice with a certain delay as an acoustic echo, which makes hearing and speaking difficult. It is therefore desired that, in the voice collected by the remote microphone, the acoustic echo sneaking from the speaker is canceled and the remaining voice is sent out to the other end of the line to improve the situation described above.

2) In the hands-free speech recognition apparatus, this technology improves the speech recognition rate.

In an automobile, for example, output sound from speakers for car audio and car navigation speakers is reflected, as in the case of the acoustic echo, by dashboard and window glass and enters the speech recognition microphone. This acts as non-stationary additive noise and makes degrade the speech recognition rate. It is therefore desired that, in the voice gathered by the speech recognition microphone, the voice from the speaker is canceled and the remaining is used for recognition to realize a higher speech recognition performance.

In either of these two uses, both the sound directly output from the remote speaker and the reflected sound from the wall of the room, dashboard and window glass always enter the remote microphone. Here, the direct sound from the remote speaker to the remote microphone and the reflected sound are both referred to as acoustic echoes. The paths that generate acoustic echoes from the output sound of the remote speaker are called acoustic echo generation paths.

The characteristics of the acoustic echo generation paths can be modeled by a FIR (Finite Impulse Response) filter and are believed to change depending on the situation in the room (including such factors as motions of humans and the number of people in the room) and the conditions in the car (including such factors as motions of humans, the number of passengers, open or closed state of windows). When there is little change in the characteristics of the acoustic echo generation paths, the acoustic echo canceling may seem to be able to be achieved by determining an optimum filter coefficient in advance and fixing the filter coefficient at this value. However, when the characteristics of the acoustic echo generation paths will change is generally difficult to predict. It is therefore more desirable to use an adaptive filter and dynamically estimate an optimum filter coefficient to adaptively cancel the acoustic echoes.

The adaptive filter is an approach which assumes that an observed signal is generated by convoluting an impulse response filter on a known source signal and which dynamically adjusts the filter coefficient so that a difference between the observed signal and a pseudo signal (calculated from the convolution of the known source signal and the estimated value of the filter coefficient) becomes zero. The acoustic echo can be canceled by subtracting from the observed signal a signal, which is obtained by convoluting the FIR filter coefficient that approximates the acoustic echo generation paths and the output signal from the speaker. Among the algorithms for adaptive filters proposed so far are LMS (Least Mean Square error) [S. HAYKIN, "Adaptive Filter Theory," 2nd ed. Englewood Cliffs, N.J. Prentice-Hall, 1991]; NLMS (Normalized Least Mean Square error) [S. HAYKIN, "Adaptive Filter Theory," 2nd ed. Englewood Cliffs, N.J., Prentice-Hall, 1991]; APA (Affine Projection Algorithm) [Kazuhiko OZEKI, Tetsuo UMEDA "An Adaptive Filtering Algorithm Using an Orthogonal Projection to an Affine Subspace and Its Properties," The transactions of the institute of electronics, information and communication engineers, published by the institute of electronics, information and communication engineers in Japan, Vol. J67-A, No. 2, pp. 126-132, 1984]; RLS (Recursive Least Squares) [S. HAYKIN, "Adaptive Filter Theory," 2nd ed. Englewood Cliffs, N.J., Prentice-Hall, 1991]. NLMS, in particular, has found a wide range of applications because of its small amount of calculation and because a convergence speed does not depend on the magnitude of the known source signal. It is pointed out, however, that the convergence speed of the filter coefficient for a colored sound signal such as speech is slower than those of APA and RLS.

The coefficient of the FIR filter and the input data (known source signal) to the FIR filter at time t are expressed as follows:

$$h(t)=[h_1(t), h_2(t), \ldots, h_M(t)]^T \tag{1}$$

$$x(t)=[x(t), x(t-1), \ldots, x(t-M+1)]^T \tag{2}$$

Here T represents a transpose. M represents an order of the FIR filter. If we let y(t) stand for a microphone input signal at time t, NLMS is generally given by the following expression.

$$r(t)=h(t)^T x(t) \tag{3}$$

$$e(t)=y(t)-r(t) \tag{4}$$

$$h(t+1) = h(t) + \frac{\mu}{a + \|x(t)\|^2} x(t)e(t) \tag{5}$$

Here $\|\cdot\|^2$ represents an energy of a vector. $\mu$ represents a constant (called a step gain) that determines the update speed of the filter coefficient and is required to meet the condition of $0<\mu<2$ for the filter coefficient to converge. a is a positive constant to prevent the second term on the right-hand side of equation (5) from diverging when $\|x(t)\|^2$ is a very small value. FIG. 1 shows a block diagram of NLMS representing the above equation in the form of a circuit. Here, r(t) is referred to as a pseudo acoustic echo signal and e(t) as an acoustic echo-canceled signal. FIG. 2 shows an example in which an acoustic echo canceler (AEC) using an adaptive filter such as NLMS is installed in a room. For simplicity, the input into AEC 1 of a signal output from the speaker 2 is referred to as a far-end input, the input from the microphone 3 as a near-end input, the output to the speaker 2 as a near-end output, and the output signal of the AEC 1 after being acoustic echo-canceled as a far-end output. It is assumed that the far-end input and the near-end output are totally equivalent and that the characteristics (such as speaker characteristics) of a system that generates the near-end output from the far-end input are included in the characteristics of the acoustic echo generation paths.

As for such an acoustic echo canceler, rigorous research efforts have been made concerning the following problems.

1) Control of Step Gain

Although the step gain needs to be set as large as possible to increase the convergence speed, too large a step gain will cause howling and thus the setting should be made appropriately in accordance with the environment of use. Representative step gain control methods so far proposed include the ES (Exponential Step) method [S. MAKINO, Y. KANEDA and N. KOIZUMI, "Exponentially Weighted Stepsize NLMS Adaptive Filter Based on the Statistics of a Room Impulse Response" IEEE Trans. SAP, Vol. 1, No. 1, pp. 101-108, 1993]. Because the amount of change in the adaptive filter coefficient in a room when the coefficient is updated has an exponential attenuation characteristic, this method sets the step gain exponentially (i.e., step gain is set large in the first half of the impulse response in which the amount of change in the coefficient is large, and set small in the latter half). It has been shown that the time it takes for the residual echo level to decrease is about half that of the ordinary NLMS.

2) Detection of Double Talk

In a double talk (a situation where a far-end talker and a near-end talker both speak at the same time), if AEC (NLMS) 1 continues to update the adaptive filter coefficient, the filter coefficient is greatly disturbed with the result that the echo cancel amount decreases, making howling likely to occur. It is therefore important how quickly the double talk is detected to control the updating of the adaptive filter of AEC 1. For the detection of double talk a method using a residual echo power [Kensaku FUJII, Juro OHGA, "Double-Talk Detection Method with Detecting Echo Path Eluctuation," The transactions of the institute of electronics, information and communication engineers, published by the institute of electronics, information and communication engineers in Japan, Vol. J78-A, NO. 3, pp. 314-322, 1995] is considered to be effective because this method can detect small voice of a near-end talker that would otherwise be buried in acoustic echoes.

3) Detection of Acoustic Echo Path Variations

In the event that the acoustic echo path changes, as will occur when a near-end talker moves, residual echoes increase, which may be judged as a double talk, causing the updating of the adaptive filter coefficient to be stopped. To cope with this problem requires distinguishing between a double talk and an acoustic echo path change and, in the case of the acoustic echo path change, continuing to update the adaptive filter coefficient. A method for realizing this function is proposed [Kensaku FUJII, Juro OHGA, "Double-Talk Detection Method with Detecting Echo Path Eluctuation," The transactions of the institute of electronics, information and communication engineers, published by the institute of electronics, information and communication engineers in Japan, Vol. J78-A, NO. 3, pp. 314-322, 1995].

FIG. 3 shows an example case in which AEC 1 of NLMS is installed in a passenger cabin of a car to remove additive noise from a known source in order to enhance a robust speech recognition function under the automotive environment where acoustic and voice signals of car audio and car navigation equipment are output from speakers. Components in FIG. 3 identical with those of FIG. 2 are assigned like reference numbers.

An effort is being made to apply AEC 1 in realizing a so-called Barge-In (Talk-Through) function, the function that can recognize a voice uttered while a guidance speech is output from the speaker 2. Here, a recovery rate at which erroneous recognition of voice from the speaker 2 can be recovered into correct recognition by the effect of the adaptive filter is referred to as an RRE (Recovery Rate of Error).

For example, in a voice interactive system installed in a conference room, it has been shown that by suppressing the guidance voice of the speaker 2 entering into the microphone 3 by AEC 1, 70-80% RRE can be obtained [Satoshi TAKAHASHI, Shigeki SAGAYAMA, "Recognising barge-in speech using NOVO composition technique," Nihon Onkyo Gakkai, Kenkyuhappyokai, Koenronbunshu, 2-5-1, pp. 59-60, 1996-3].

However, there are few reports on the research results of the acoustic echo canceler in an automotive cabin in which there are additive noise of an unknown source and the noise level constantly changes. The hands-free apparatus for car phones uses a combination of a voice switch (an alternated talk system by comparing energies of the near-end input and the far-end input) and an acoustic echo canceler and it has been pointed out that the speech quality of this apparatus is not satisfactory as the starting and ending portions of words are often cut off.

Generally, when the adaptation of the coefficient is continued under the situation where sound other than that produced from the near-end output enters into the near end input (hereinafter referred to as a situation in which there is a near-end input), the estimation precision of the filter coefficient deteriorates, degrading the acoustic echo canceling performance. Hence, in a situation where there is a far-end input and also a near-end input (called a double talk state), it is general practice to stop the updating of the filter coefficient as represented by equation (5). Whether there is a far-end input can be known by simply comparing the energy of the far-end input with a predetermined threshold value.

On the other hand, when a check is made similarly on whether a near-end input exists, many occasions occur in which it is decided that the near-end input exists, because of the influence of the acoustic echo. As a result, the updating of the filter coefficient by equation (5) is stopped frequently, resulting in a degraded estimation precision of the filter coefficient. To deal with this problem, a method of checking the existence of the near-end input may be conceived which uses the energy of an acoustic echo-canceled signal e(t) instead of a near-end input signal y(t). The sound, other than that generated by the near-end output, which enters the near-end input can be classified into two sounds. One is additive noise of an unknown source, such as noise of a running car, and a human voice, none of which is eliminated by the adaptive filter and remains in the far-end output.

Under the environment in a running car, it is generally difficult to determine a unique optimum threshold value for checking the existence of a near-end input because the energy level of the additive noise of an unknown source greatly varies in a range of 60-80 dBA [Hisanori KANASASHI, Takeshi NORIMATSU, Yasuhiko ARAI, "A Word Recognition System to be used in Automobile Noise Environment," Nihon Onkyo Gakkai, Kenkyuhappyokai, Koenronbunshu, 1-Q-32, pp. 159-160, 1995-3], [Kunikazu SUZUKI, Kazuo NAKAMURA, Yutaka UONO, Hiroshige ASADA, "Continuous Speech Recognition in Vehicle Noisy Environment," Nihon Onkyo Gakkai, Kenkyuhappyokai, Koenronbunshu, 2-Q-4, pp. 155-156, 1993-10).

It is expected that there are cases where application of the acoustic echo path fluctuation detection method described above [Kensaku FUJII, Juro OHGA, "Double-Talk Detection Method with Detecting Echo Path Eluctuation," The transactions of the institute of electronics, information and communication engineers, published by the institute of electronics, information and communication engineers in Japan, Vol. J78-A, NO. 3, pp. 314-322, 1995] is difficult because the influence of the additive noise of an unknown source degrades the correlation between the near-end input and the pseudo acoustic echo signal. A speech detection algorithm with a capability of correctly distinguishing between additive noise of an unknown source and human voice is considered to be a viable solution.

First, the acoustic echo canceling performance of NLMS when only running car noise exists is evaluated. FIGS. 4A, 4B, 4C 4D and 4E show a spectrogram of a far-end input signal (pop music), a spectrogram of a near-end input signal during idling, a spectrogram of an acoustic echo-canceled signal of the near-end input signal during idling, a spectrogram of a near-end input signal while traveling at 100 km/h, and a spectrogram of an acoustic echo-canceled signal of the near-end input signal while traveling at 100 km/h, respectively.

The volume of a car audio equipment was set at a level such that a male driver felt comfortable hearing music. Thus, the speaker output level and the acoustic echo level are higher when traveling at the speed of 100 km/h. The near-end input signal was recorded by a unidirectional microphone attached to a driver's seat sun visor in a 2000-cc car. The initial value of the filter coefficient was set to 0.0 in all cases and the acoustic echo-canceled signal was obtained continuously starting at a time of 0 second while updating the filter coefficient by the equations (3)-(5). The sampling frequency was 8 kHz and the maximum delay of the acoustic echoes of up to 32 ms was considered. Thus, the number of taps of the FIR filter was 256.

ERLE (Echo Return Loss Enhancement) is often used as a measure of evaluating the adaptive filter performance. The ERLE represents an attenuation of the near-end input signal and is defined by the following equation [Nobuo KITAWAKI, compiler and author, "Speech Communication Technology— Speech and Acoustics Technologies for Multimedia Services—," Corona Publishing Co., LTD., Tokyo, Japan, 1996].

$$ERLE = 10 \cdot \log_{10} \frac{E[y(t)^2]}{E[e(t)^2]} \quad (6)$$

E[•] represents an estimated value, which is determined by:

$$E[z(t)^2] = (1-\lambda) \cdot E[z(t-1)^2] + \lambda \cdot z(t)^2 \quad (7)$$

where $\lambda = 1/256$. The unit of ERLE is dB. The maximum and average values of ERLE during idling are 18.80 dB and 10.13 dB respectively. The maximum and average values of ERLE while traveling at the speed of 100 km/h are 9.33 dB and 5.89 dB respectively. It should be noted that the greater the level of the additive noise of an unknown source for the near-end input, the lower the value of ERLE given by equation (6) will be.

FIGS. 4C and 4E show that the acoustic echoes can almost be canceled either during idling or at the speed of 100 km/h. When human voice is not included in the near-end input, it seems that continuously updating the filter coefficient can cancel a major portion of the acoustic echoes. In other words, the running noise, which is among the additive noise of an unknown source and which is steady and not associated with human speech, is considered to have little effect on the estimation of the filter coefficient.

Next, let us examine a case where human voice is included in the near-end input. Additive noise data was gathered by driving 2000-cc automobile in a town with pop music played from car audio equipment at a speed of 60 km/h. At this time, the volume of the music was set at a level such that a female could comfortably hear the music. Next, in the same car with an engine at rest, voice ("akarui" (meaning "bright" in Japanese)) uttered by the same female was recorded at the same recording level.

A spectrogram of a signal obtained by adding the additive noise data and the voice data by a computer is shown in FIG. 7A. FIG. 7B shows a spectrogram of an acoustic echo-canceled signal when the filter coefficient was continuously updated from a time of 0 second with the initial value of the filter coefficient set at 0.0. FIG. 7C shows a change in the value of a tenth filter coefficient. At this time, the maximum and average values of ERLE are 8.48 dB and 4.18 DB respectively.

In particular, it is clearly seen that the value of filter coefficient is unstable for a 0.15-second duration from around a time of 0.5 seconds during which the coefficient vibrates wildly. It is also shown that the acoustic echoes (a portion enclosed by an ellipse in FIG. 7) following a time of 1.0 second was not canceled. It is necessary to stop the updating the filter coefficient while there is voice in the near-end input and, while there is no voice in the near-end input, to continue updating the filter coefficient regardless of presence or absence of a stationary additive noise. This requires a speech detection algorithm that can correctly decided whether or not human speech is included in the near-end input which receives additive noise of an unknown source.

In the speech recognition system, precisely detecting speech interval (detection of speech) is very important. Under an environment where there is little background noise, detecting voice correcting is not so difficult. However, under an environment in which the presence of background noise cannot be ignored, as in the car cabin during traveling, it is substantially difficult to detect voice. Particularly, weak fricative sounds situated at the beginning of a speech, weak nasal sounds, unvoiced vowel at the beginning or end of the speech are often buried in the background noise and difficult to detect. Breathing sounds and tongue-clicking sounds should be detected as non-speech sounds but are often detected as speech sounds, leading to erroneous recognition.

It is a general method to detect the starting point of a speech sound according to whether a short-term power higher than a predetermined threshold value continues successively for more than a certain frame and to detect the ending point of a speech sound according to whether a short-term power lower than the predetermined threshold value continues successively for more than the certain frame. There are also attempts to use two threshold levels for more accurate detection of speech, or to use the number of times the voice signal crosses the zero level [Sadaoki FURUI, "Digital Speech Processing," Digital Technology Series, Tokay University Shuppan Kai, Tokyo, Japan, 1985 in Japanese]. In an environment where the presence of additive noise of an unknown source can be ignored, there is no problem if a speech detection is used which uses only time domain information such as short-term power and the number of zero-crossing.

In an environment where the additive noise of an unknown source cannot be neglected, the acoustic echo canceler using the conventional speech detection method has the following drawbacks. First, the acoustic echo canceler may pick up additive noise of an unknown source as a speech sound when in reality there is no voice in the microphone input, leaving the filter coefficient not updated, failing to follow a change in the acoustic characteristics, and degrading the acoustic echo canceling performance. Second, the acoustic echo canceler may decide that there is no speech when in reality there is a voice in the microphone input, updating the filter coefficient with the result that the coefficient departs from the desired value. This in turn degrades the acoustic echoes canceling performance. It is therefore desired that not only the time domain information but also frequency domain information such as spectrum be used in combination.

Japanese Patent Application No. 213946/1993 (NTT) describes an acoustic echo canceler which uses a double talk detection circuit that decides whether a speech is included in an input voice signal by using time and frequency domain information of source information on the input voice signal (a signal before being echo-canceled) and on an additive noise with a known source. This echo canceler assumes that the echoes getting into the input voice signal are only those influenced by the source signal. It therefore has a drawback of low double talk detection precision when there is ambient noise. Further, it does not have a buffer for holding an impulse response estimated by the adaptive filter (coefficient value of the FIR filter).

Japanese Patent Laid-Open No. 102887/1993 (Toshiba) uses a double talk detection circuit that checks for a double talk on the basis of the magnitude of an echo-canceled signal. Because the decision made by this method does not use a combination of time information and frequency information, there is a drawback that the decision precision is not satisfactory under an environment where there is ambient noise.

Japanese Patent Laid-Open No. 303066/1995 (NTT Mobile Communications Network Inc.) employs a configuration that compensates for a delay of the decision means by an impulse response register. Because it does not include a means for checking in each frame whether the input voice signal includes a speech by using the time information and the frequency information of an echo-canceled signal, there is a limit on the double talk detection performance.

WO96/42142 (NOKIA) includes a means to check in each frame whether the input voice signal includes a speech by using the time domain information and the frequency domain information of an echo-canceled signal. This invention, however, is not related to the acoustic echo canceler but is related to an acoustic echo suppressor that keeps acoustic echoes from being transmitted directly by reducing the gain of a transmit signal of a car phone ground station.

SUMMARY OF THE INVENTION

It is an object of the present invention to provide a speech processing apparatus and method that can improve the capability of removing noise from a voice signal under an environment where acoustic noise is likely to enter into the voice signal.

The present invention may comprise generation means for generating a pseudo acoustic echo signal based on a current impulse response simulating an acoustic echo transfer path and on a source signal, supply means for holding the current impulse response and supplying the current impulse response to the generation means, elimination means for subtracting the pseudo acoustic echo signal from a microphone input signal to remove an acoustic echo component and thereby generate an acoustic echo-canceled signal, update means for continually updating the impulse response by using the source signal, the acoustic echo-canceled signal and the current impulse response held by the supply means and for supplying the updated impulse response to the supply means, decision means for checking, in each frame, whether or not a voice is included in the microphone input signal, by using time domain information and frequency domain information on the acoustic echo-canceled signal, storage means for storing one or more impulse responses and control means for, in a frame for which the result of decision made by the decision means is negative, storing in the storage means the current impulse response held by the supply means and, in a frame for which the result of decision is positive, retrieving one of the impulse responses stored in the storage means and supplying it to the supply means.

In this invention, the acoustic echo-canceled signal may be used for speech recognition. The present invention may further include means for determining a spectrum for each frame by performing the Fourier transform on the acoustic echo-canceled signal, means for successively determining a spectrum mean for each frame based on the spectrum obtained and a means for successively subtracting the spectrum mean from the spectrum calculated for each frame from the acoustic echo-canceled signal to remove additive noise of an unknown source.

The present invention may further include means for determining a spectrum for each frame by performing the Fourier transform on the acoustic echo-canceled signal, means for successively determining a spectrum mean for each frame based on the spectrum obtained, means for successively subtracting the spectrum mean from the spectrum calculated for each frame from the acoustic echo-canceled signal to remove additive noise of an unknown source, means for determining a cepstrum from the spectrum removed of the additive noise, means for determining for each talker a cepstrum mean of a speech frame and a cepstrum mean of a non-speech frame, separately, from the cepstrums obtained and means for subtracting the cepstrum mean of the speech frame of each talker from the cepstrum of the speech frame of the talker and for subtracting the cepstrum mean of the non-speech frame of each talker from the cepstrum of the non-speech frame of the talker to compensate multiplicative distortions that are dependent on microphone characteristics and spatial transfer characteristics from the mouth of the talker to the microphone.

The present invention may further include means for determining a spectrum for each frame by performing the Fourier transform on the acoustic echo-canceled signal, means for determining a cepstrum from the spectrum obtained, means for determining for each talker a cepstrum mean of a speech frame and a cepstrum mean of a non-speech frame, separately, from the cepstrums obtained and means for subtracting the cepstrum mean of the speech frame of each talker from the cepstrum of the speech frame of the talker and for subtracting the cepstrum mean of the non-speech frame of each talker from the cepstrum of the non-speech frame of the talker to compensate multiplicative distortions that are dependent on microphone characteristics and spatial transfer characteristics from the mouth of the talker to the microphone.

The present invention may comprise means for determining a spectrum for each frame by the Fourier transform, means for determining a cepstrum from the spectrum obtained, means for determining for each talker a cepstrum mean of a speech frame and a cepstrum mean of a non-speech frame, separately, from the cepstrums obtained and means for subtracting the cepstrum mean of the speech frame of each talker from the cepstrum of the speech frame of the talker and for subtracting the cepstrum mean of the non-speech frame of each talker from the cepstrum of the non-speech frame of the talker to compensate multiplicative distortions that are dependent on microphone characteristics and spatial transfer characteristics from the mouth of the talker to the microphone.

In the process of performing echo canceling by using a pseudo acoustic echo signal, the present invention continuously uses an impulse response used for the previous frame as an impulse response to generate the pseudo acoustic echo signal when the microphone input signal is a voice signal, and uses a newly updated impulse response when the microphone input signal is not a voice signal.

Furthermore, the present invention determines a spectrum and a spectrum mean for each frame from the acoustic echo-canceled signal and removes additive noise by using the spectrum and spectrum mean thus obtained.

BRIEF DESCRIPTION OF THE DRAWINGS

FIG. 5 is a block diagram showing VAD (Voice Activity Detection) processing.

DETAILED DESCRIPTION OF THE PREFERRED EMBODIMENTS

Figure 1:
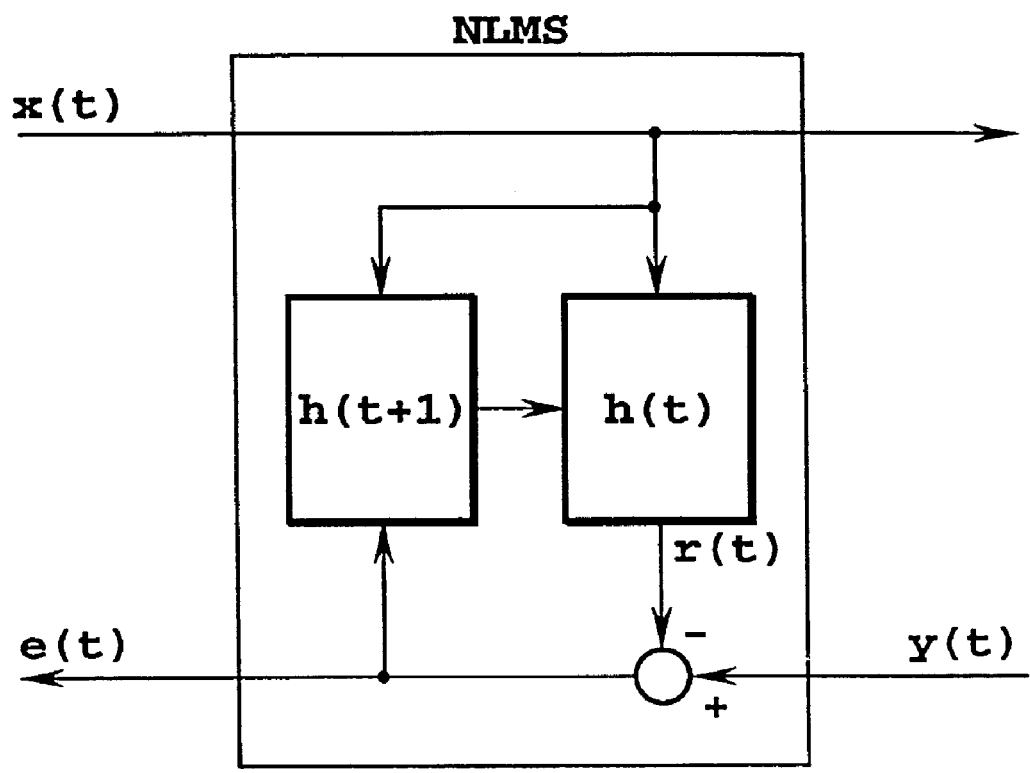
FIG. 1 is a block diagram showing a functional configuration of NLMS (Normalized Least Means Square error).
Figure 2:
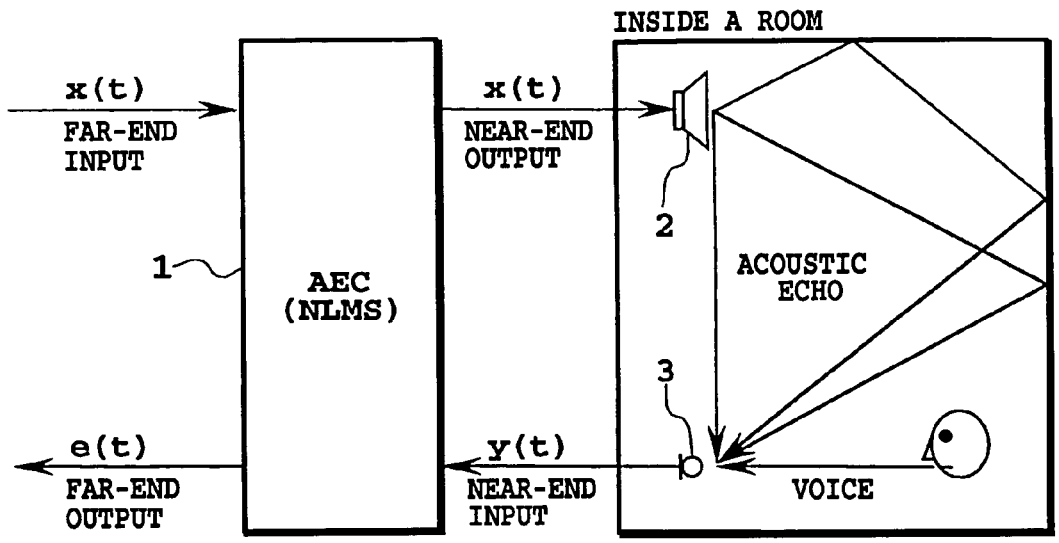
FIG. 2 is a schematic diagram showing an example arrangement of an acoustic echo canceler.
Figure 3:
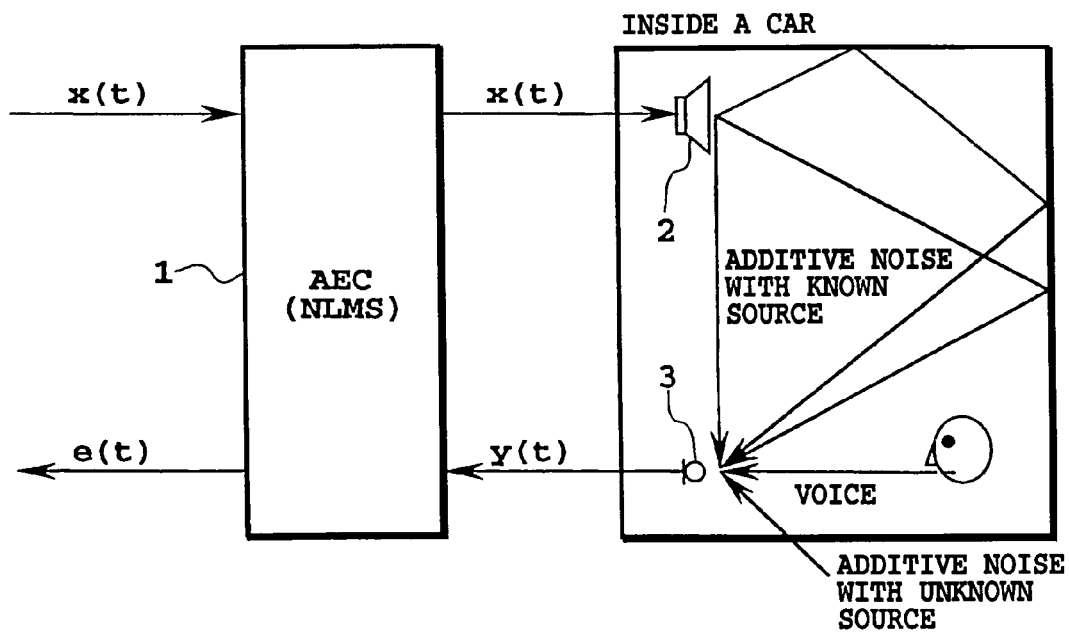
FIG. 3 is a schematic diagram showing an example arrangement for removing additive noise of an unknown source in an automotive cabin.
Figure 4A:
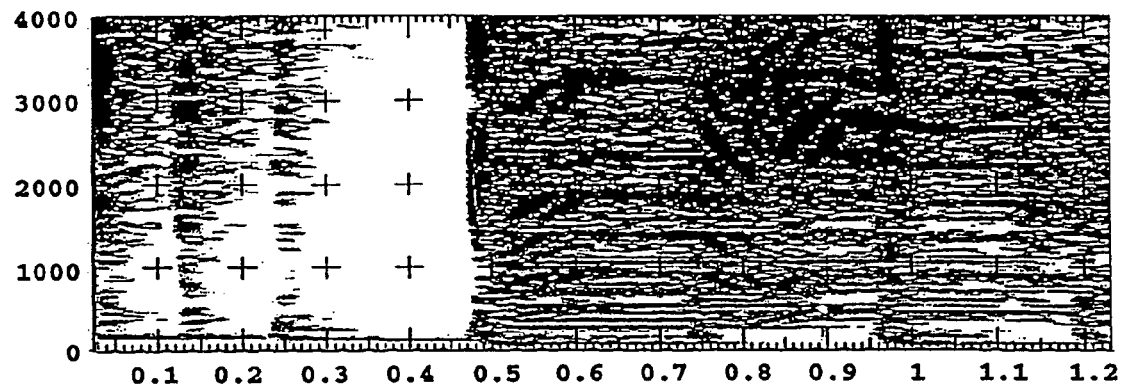
FIGS. 4A-4E are graphs showing NLMS (Normalized Least Means Square error) performances with an abscissa representing time in seconds.
Figure 4B:
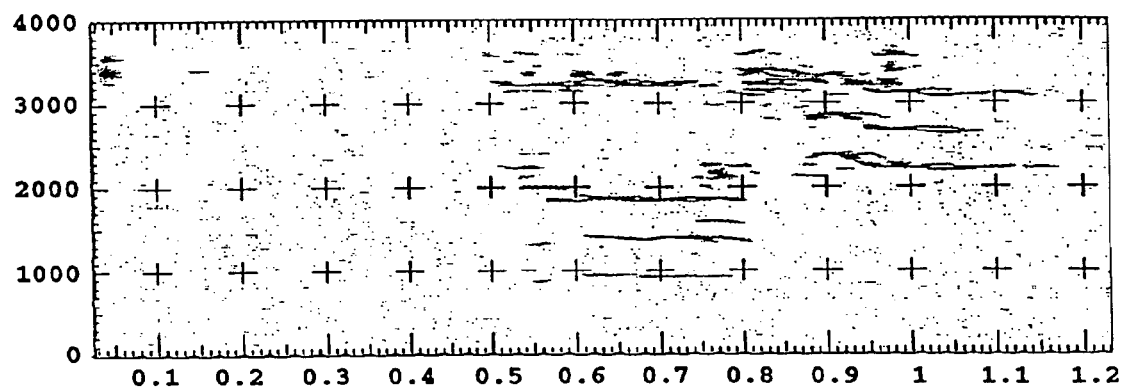
Figure 4C:
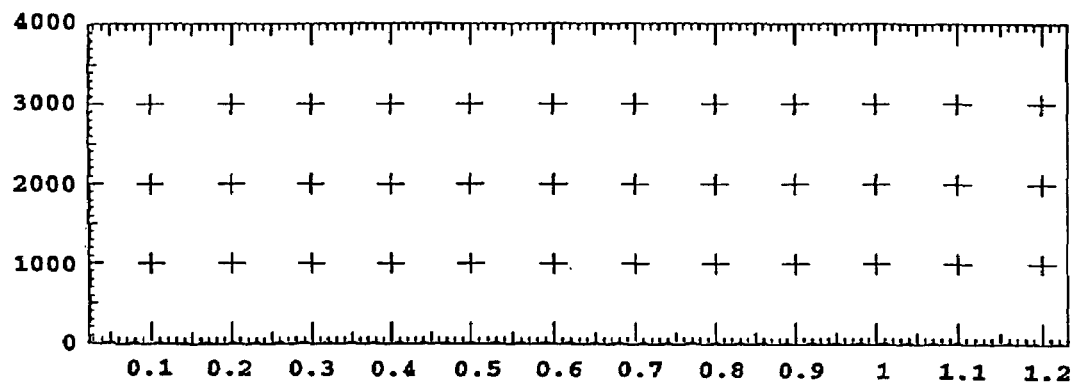
Figure 4D:
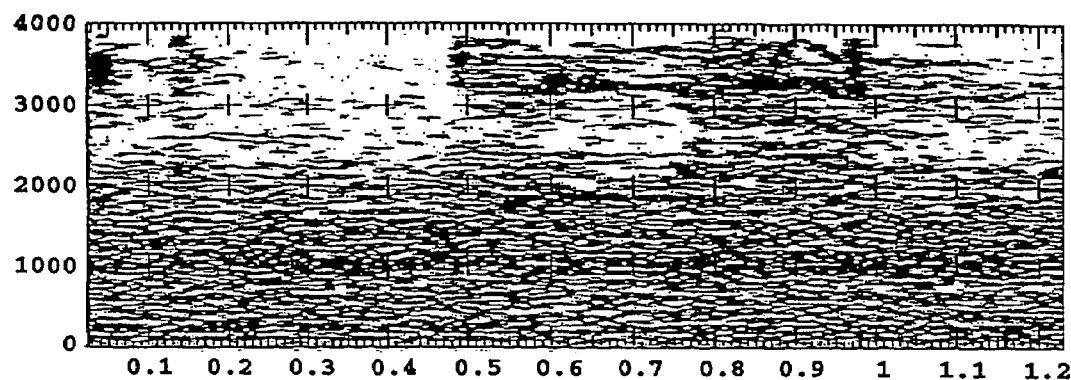
Figure 4E:
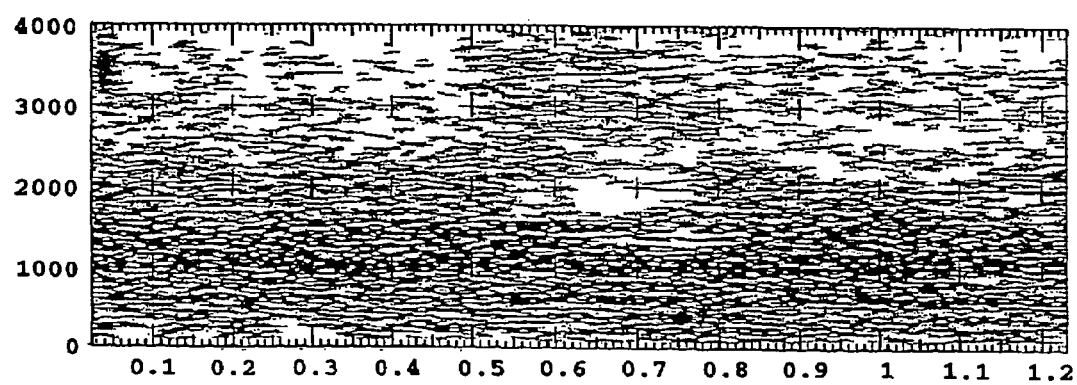

Among speech detection algorithms that utilizes time domain information such as short-term power and pitch and frequency domain information such as spectrum, there is a VAD (Voice Activity Detection) [Recommendation GSM 06.32.] that is standardized by GSM, a European cellular phone/car phone system. The VAD is designed to extend the life of a battery by finely controlling the operation of digital signal processing such as voice CODEC (compression/decompression) to reduce power consumption. FIG. 5 shows a simple configuration of the VAD. First, a self-correlation function (time domain information) is determined for each frame from a voice signal. Based on the self-correlation function, a linear prediction coefficient (time domain information) by LPC (Linear Predictive Coding) is obtained. Using an inverse LPC filter configured from the linear prediction coefficient and the self-correlation function, a short-term power (time domain information) of the voice signal can be determined. The short-term power and a threshold value are compared to make a VAD decision.

When the short-term power is greater than the threshold value, a local VAD lag with a value 1 is output. If not, a local VAD flag with a value 0 is output. Then, a VAD post-processing determines a final VAD flag value based on a history of the local VAD flag values for a plurality of past frames.

On the other hand, the threshold value used for comparison with the short-term power in the VAD decision is adapted as follows. When a change in a spectrum (frequency domain information) represented by the smoothed self-correlation function and a self-correlation prediction coefficient is sufficiently small among consecutive frames, it is decided that the stationary of the spectrum is high. Possible voice signals considered to have a high level of stationary in spectrum include background noise or vowel.

The threshold value adaptation is performed in the frame of background noise but should not be performed in a vowel frame. Pitch information is used to make distinction between background noise and vowel. A pitch lag (pitch period) (time domain information is calculated from the self-correlation function determined from the voice signal). When a change in the pitch lag is small between consecutive frames, the frame of interest is decided to represent a vowel and a pitch flag with a value 1 is output. If not, a pitch flag with a value 0 is output.

Using a short-term power, a residual signal self-correlation prediction coefficient determined from the inverse LPC filter, a pitch flag, and information on stationary, the threshold value is adapted during frames where the spectrum stationary is high and the pitch feature is low. This VAD provides an accurate speech detection capability for the background noise, irrespective of the noise level, such as engine and road noise which is relatively stationary.

In the car, when the microphone is located remote from the mouse of a driver, for example, at a sun visor for the sake of safety, the signal-to-noise ratio (SNR) deteriorates to below 10 dB. In that case, it is found that the speech detection performance of the VAD algorithm significantly deteriorates.

Figure 6:
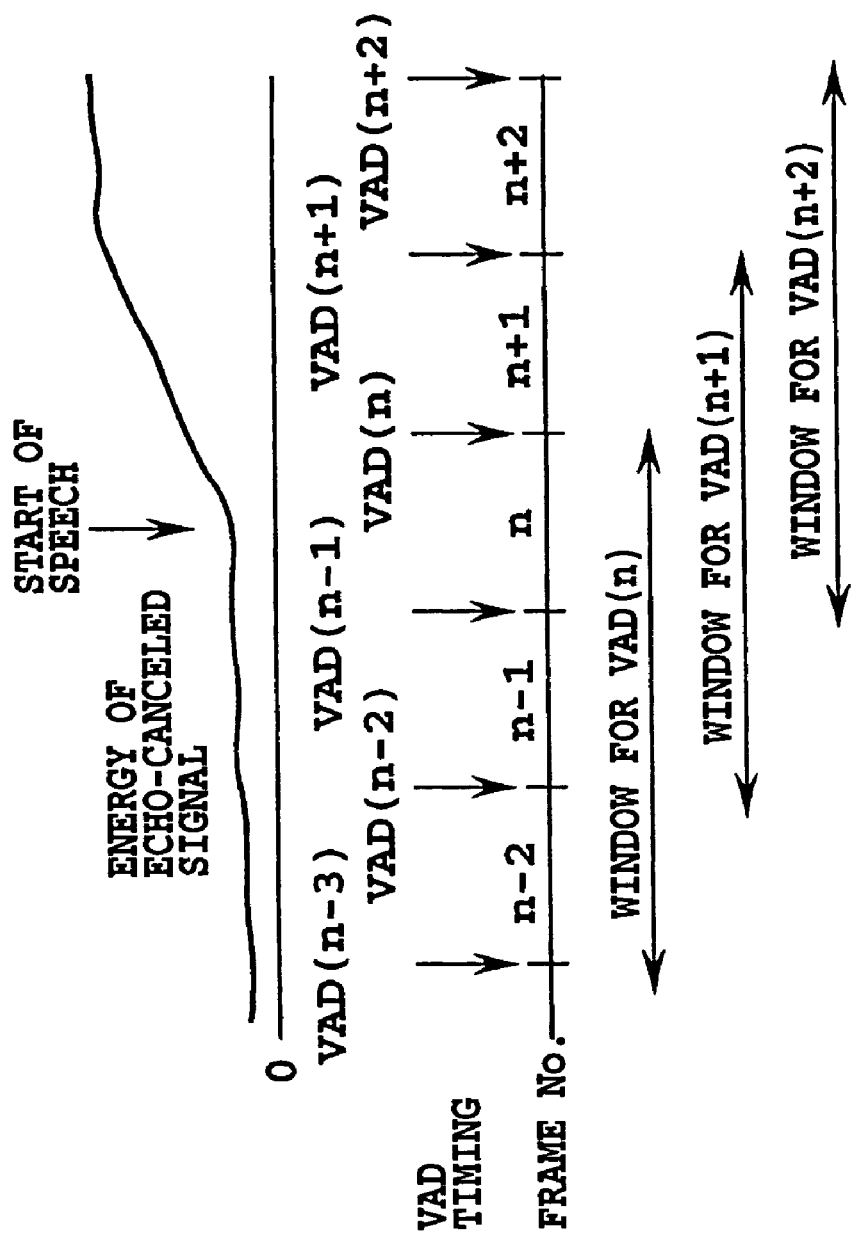
FIG. 6 is a diagram showing an operation timing of VAD.

Then, to ensure precise speech detection even at around SNR 10 dB, some improvements were made on the adaptation of the threshold value. Currently, the window length of voice used for VAD is 32 ms and frame shift is 10 ms. Hereinafter, when the VAD detects the presence of a voice, the VAD is said to be ON. Conversely, if a voice is not detected, we refer to this situation as the VAD being OFF. Because the VAD checks once in each frame whether a voice is included in the near-end input, the speech detection timing can delay from the actual rising edge of the voice. FIG. 6 shows the relation among the frames, the VAD operation timing and the window length used by the VAD. When the start of the actual voice is at the center of a frame n, then it is highly probable that the VAD can only detect the start of that voice from a frame n+1 or later. If the voice is able to be detected at a frame n+2 of VAD, the detection delay from the actual start of the voice is as large as 25 ms, during which time the estimated value of the echo path may become unstable.

Figure 7A:
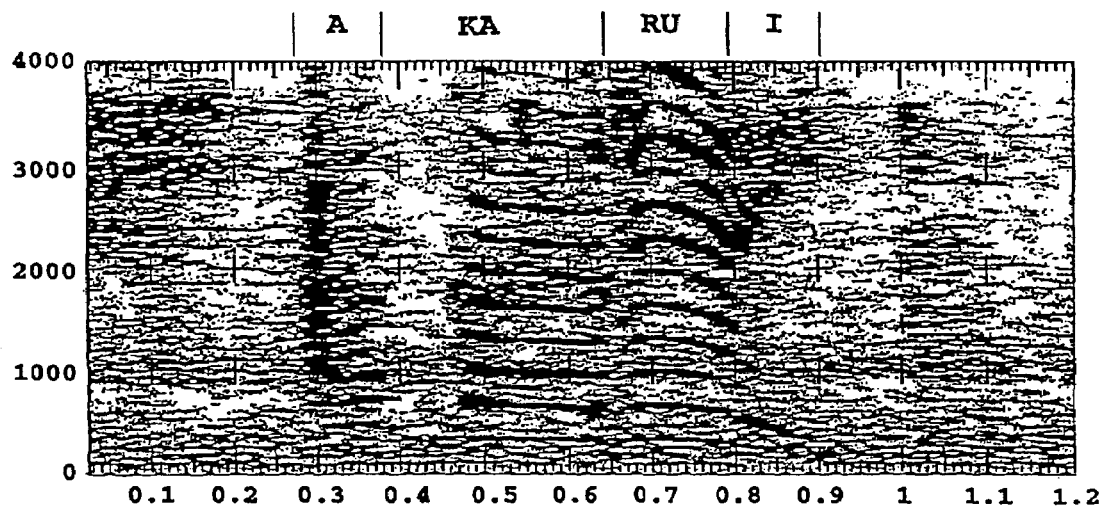
FIGS. 7A-7G are graphs showing the effects of NLMS-VAD (Normalized Least Mean Square error with frame-wise Voice Activity Detection) with an abscissa representing time in seconds.
Figure 7B:
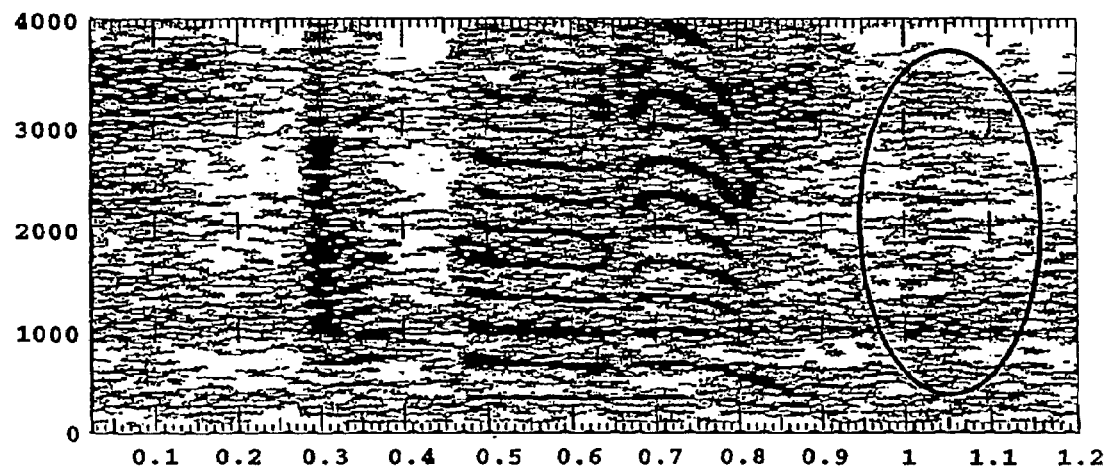
Figure 7C:
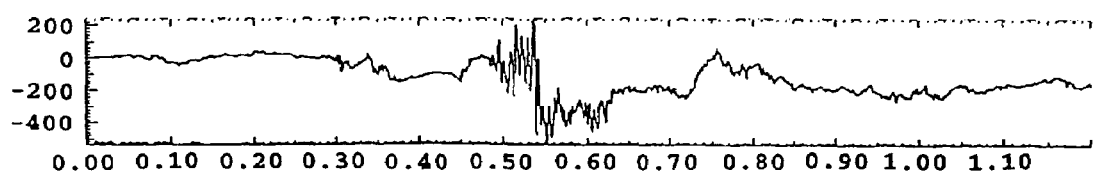
Figure 7D:
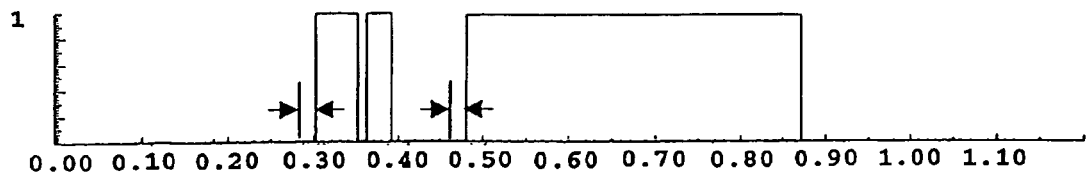
Figure 8:
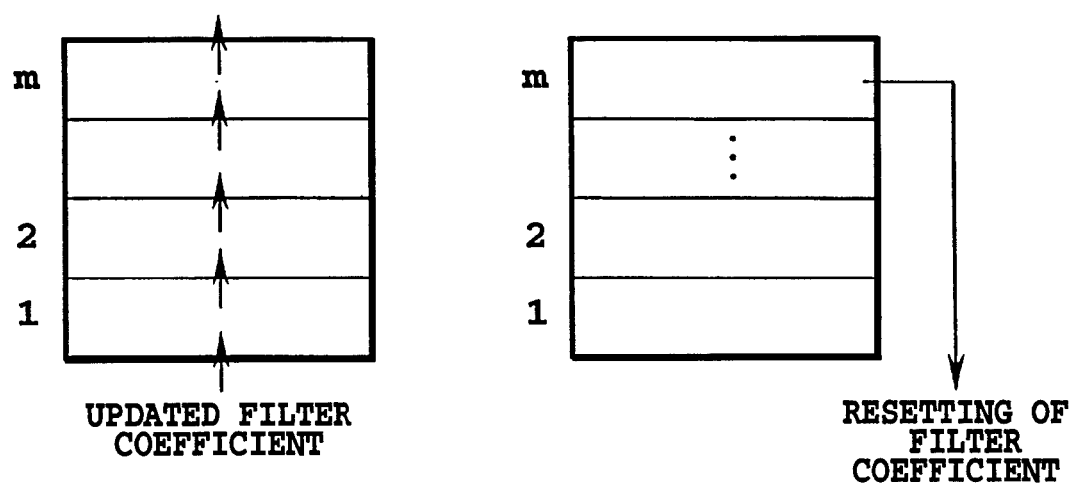
FIG. 8 is a diagram showing the operation of a filter coefficient buffer.

FIG. 7D shows how the voice is detected by the VAD. A level 1 indicates that a voice is detected. As shown by arrows, the speech detection delay of about 2 frames can be observed. If the unstable filter coefficient value can be recovered to a higher precision value, it is considered possible to avoid degradation of the acoustic echo canceling performance. For that purpose, a buffer for storing m filter coefficients (referred to as a filter coefficient buffer) is provided. In the frames where the VAD is OFF, the filter coefficients stored at n-th (m−1≧n≧1) locations are transferred to n+1st storage locations successively and at the same time the current adaptive filter coefficient is stored at the first storage location of the filter coefficient buffer. As a result, the filter coefficient stored at m-th storage location is automatically discarded. On the other hand, in the frames where the VAD is ON, the filter coefficient stored at m-th location of the filter coefficient buffer is retrieved and the degraded filter coefficient is reset by the retrieved value. FIG. 8 shows the operation of the filter coefficient buffer. The maximum and average values of ERLE when m is set to 0-4 are shown in Table 1.

TABLE 1

Relation between filter buffer size and ERLE
(Echo Return Loss Enhancement)

| Buffer size m | Max. ERLE (dB) | Average ERLE (dB) |
|---|---|---|
| 0 | 8.80 | 4.18 |
| 1 | 9.06 | 4.25 |
| 2 | 9.15 | 4.35 |
| 3 | 9.14 | 4.36 |
| 4 | 9.14 | 4.36 |

A case m=0 represents the case where the coefficient value is neither stored nor reset. When m≧2, there is little difference in ERLE and thus m=2 is selected. This corresponds to the VAD's detection delay (about 2 frames).

Figure 7E:
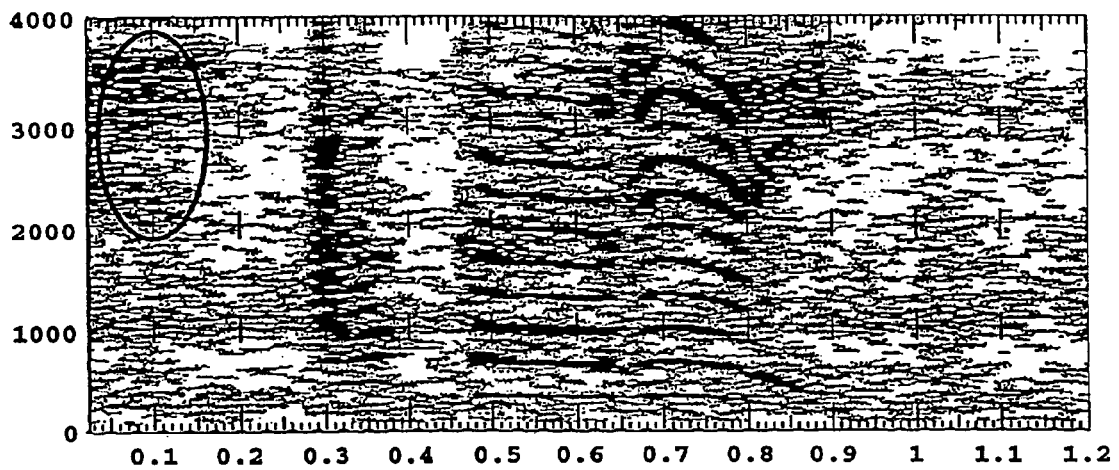
Figure 7F:
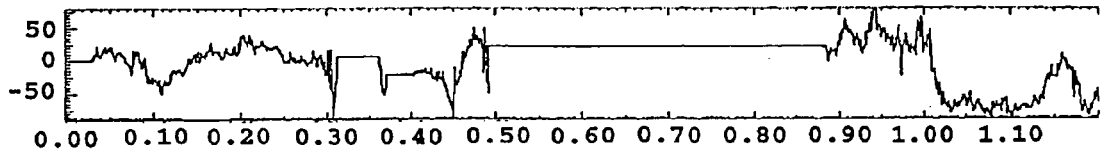
Figure 9:
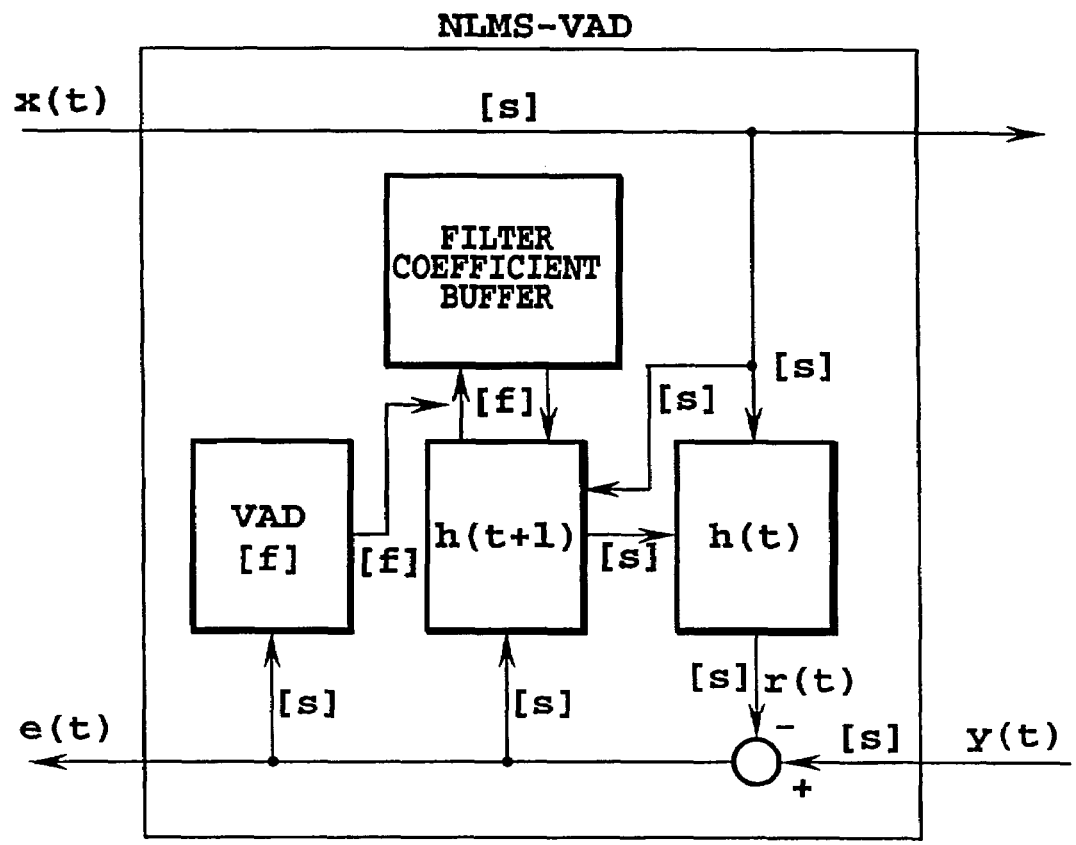
FIG. 9 is a block diagram showing the configuration of NLMS-VAD.

The algorithm with the above-described features is called NLMS-VAD (NLMS with frame-wise VAD) and its overall block diagram is shown in FIG. 9, in which [s] and [f] respectively represent sample-wise and frame-wise signal flows and operations of processing. Once the VAD turns ON, the updating of the filter coefficient is stopped until the VAD turns OFF next. FIG. 7E shows a spectrogram of the acoustic echo-canceled signal when the VAD is operated with the initial values of all filter coefficients set to 0.0 and the filter coefficients are updated from time 0 while storing and resetting the filter coefficient values. FIG. 7F shows a change in the value of 10th filter coefficient during the process. Immediately before the frame at which the updating of the filter coefficient was stopped, the filter coefficient value became unstable. It is seen, however, that the storing and resetting of the filter coefficient as described above recovered the filter coefficient. As a result, acoustic echoes following the time of 1.0 second (a portion enclosed by an ellipse in FIG. 7B) are also canceled.

Figure 7G:
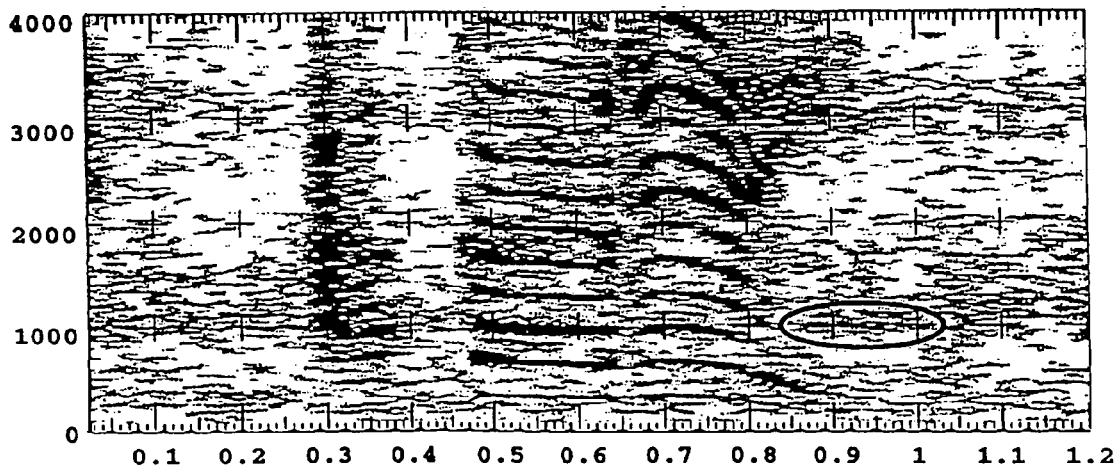

It should be noted, however, that the acoustic echoes after the time of 0.1 second (a portion enclosed by an ellipse in FIG. 7E) is not canceled. The estimation speed of the filter coefficient is considered to be improved by storing the filter coefficients estimated each time a voice is uttered and the parameters used by the VAD and then by using these as initial values when the next voice is uttered. FIG. 7G shows one such example. Although some acoustic echoes remain immediately after the time of 0.0 second, most of the acoustic echoes thereafter (a portion enclosed by an ellipse in FIG. 7E) are canceled. The maximum and average values of ERLE at this time are 9.29 dB and 4.50 dB, respectively. Regarding the NLMS-VAD method, the applicant of this invention already filed with the Japanese Patent Office a patent application of an invention of the acoustic echo canceler that utilizes a speech detection based on the time domain information and frequency domain information (Japanese Patent Application No. 051577/1997 filed on Mar. 6, 1997). The present invention differs from the above-mentioned preceding invention in that the speech detection based on the time domain information and frequency domain information is performed for each frame.

Figure 10A:
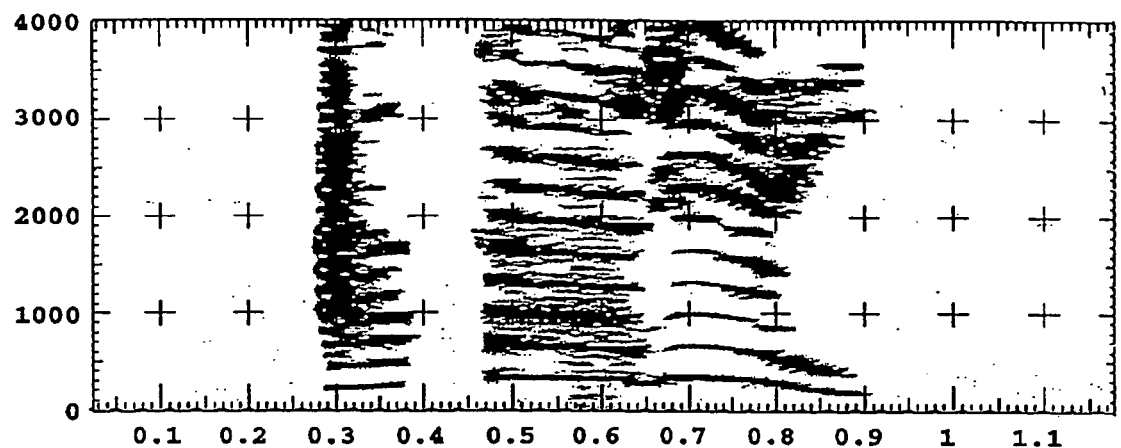
FIGS. 10A and 10B are spectrograms obtained by NLMS-VAD/CSS methods, respectively.

As a robust speech recognition method under an environment where there are additive noise with a known source and additive noise of an unknown source, a method of combining the NLMS-VAD method and the CSS (Continuous Spectral Subtraction) method will be explained. Let $O(\omega;t)$, $\hat{S}(\omega;t)$ and $\hat{N}(\omega;t)$ represent an observed spectrum, an estimated value of a voice spectrum $S(\omega;t)$, and an estimated value of additive noise at frequency $\omega$ and time t, respectively. Then the CSS method can be given as follows.

$$\hat{N}(\omega;t)=\gamma\cdot\hat{N}(\omega;t-1)+(1-\gamma)\cdot O(\omega;t) \tag{8}$$

$$\hat{S}(\omega;t) = \begin{cases} O(\omega;t) - \alpha\cdot\hat{N}(\omega;t) & \text{if } O(\omega;t) - \alpha\cdot\hat{N}(\omega;t) > \beta\cdot O(\omega;t) \\ \beta\cdot O(\omega;t) & \text{otherwise} \end{cases} \tag{9}$$

where $\alpha$ is an over-estimation factor, $\beta$ is a flooring factor and $\gamma$ is a smoothing factor and they are set at 2.4, 0.1 and 0.974, respectively, from the result of preliminary experiments. The CSS is a method which does not distinguish between speech frames and non-speech frames, but successively determines the running average of spectrum, takes this average as an estimated value of the noise spectrum, and then subtracts the noise spectrum from the input spectrum. Although there is a drawback that because the estimated value of the noise spectrum includes an influence of the voice spectrum, the voice spectrum with a weak energy may be masked and distorted, however, the CSS method has a function of masking weak-energy frequency components, whether they are noise or voice, over a certain length of past time, leaving frequency components having relatively large energy. Therefore, a change between a feature parameter obtained by applying the CSS to a clean voice and a feature parameter obtained by applying the CSS to a voice superimposed with additive noise is smaller than those of the ordinary spectrum subtraction method and the least mean square error estimation method. This is advantageous for the speech recognition with a low SNR. FIG. 10A shows a spectrogram obtained by applying the CSS to the voice uttered by a female in a car during idling ("akarui," meaning "bright" in Japanese, the same voice that was used to generate a voice of FIG. 7A by adding noise data by computer). FIG. 7B shows a spectrogram which was obtained by adding to the same voice (i.e., "akarui") additive noise of an unknown source and noise data superimposed with acoustic echoes by computer (FIG. 7A), then canceling the acoustic echoes by the NLMS-VAD method (FIG. 7G)

and applying the CSS method to the echo-canceled signal. Comparison between FIG. 7G and FIG. 10B shows that a residual component of acoustic echoes at the frequency of 1 kHz at time near 0.9 second (a portion enclosed by an ellipse in FIG. 7G) is removed by the CSS method.

The CSS method has the capability of suppressing not only stationary additive noise but also residual acoustic echoes that could not be canceled by the NLMS-VAAD method. A spectrum obtained by subjecting the acoustic echo-canceled signal e(t) to the FFT was processed by the CSS method to produce a spectrum, which was then returned to the corresponding time domain by the inverse FFT to produce a waveform signal. The resultant waveform signal was then substituted into e(t) of equation (6) to calculate the average ERLE. The average ERLE in this case was 13.60 dB. On the other hand, when only the additive noise was canceled by the CSS method without canceling the acoustic echoes by the NLMS-VAD method, the average ERLE was 9.87 dB. This can be interpreted to mean that the CSS method alone cannot cancel the additive noise with a known source which is equivalent to about 3.7 dB.

Figure 10B:
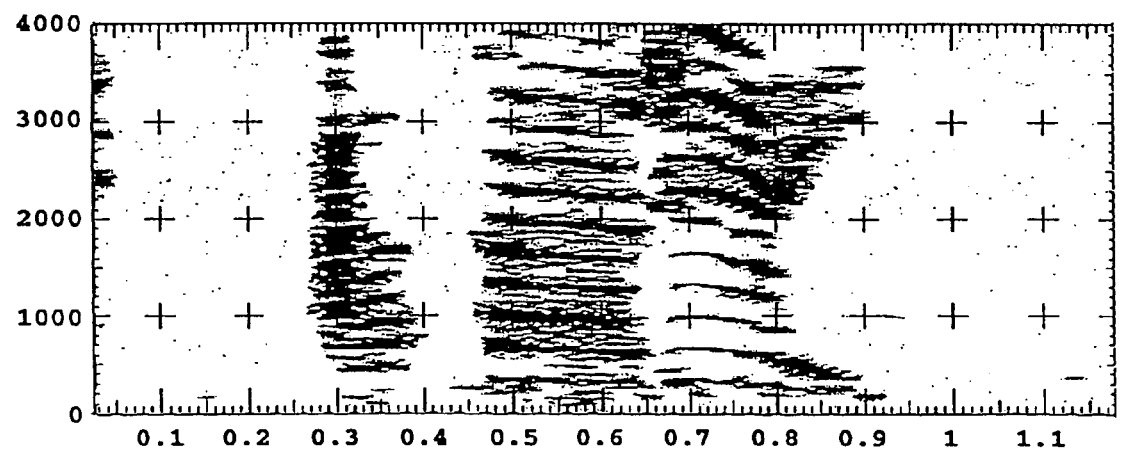

Comparison of FIG. 10A and FIG. 10B shows that the two spectrograms are very similar. This suggests that the combination of the NLMS-VAAD method and the CSS method can extract robust feature parameters for both the additive noise with a known source and the additive noise of an unknown source.

Next, a method of correcting a multiplicative distortion of a voice spectrum will be explained. $\hat{S}(\omega;t)$ An average over a long term of speech frames of short-term spectrums $S(\omega;t)$ generated at frequency $\omega$ and time t by the vocal organ of a person is called a speaker personality $H_{person}(\omega)$, which is defined as follows.

$$H_{person}(\omega) = \frac{1}{T} \cdot \sum_{t=1}^{T} S(\omega; t) \quad (10)$$

where T is a sufficiently large natural number. $H_{person}(\omega)$ can be regarded as representing a frequency characteristic unique to a talker which depends on the vocal cord source characteristic and the length of vocal tract. The short-term spectrum divided by the speaker personality, which is given below, is defined as a normalized voice spectrum.

$$S*(\omega; t) = \frac{S(\omega; t)}{H_{person}(\omega)} \quad (11)$$

Figure 11:
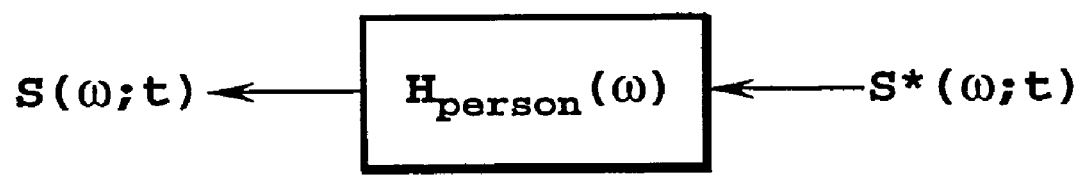
FIG. 11 is a diagram showing a time-invariant filter.

As shown in FIG. 11, the voice spectrum can be considered to be generated by the normalized voice spectrum $S^*(\omega;t)$ passing through the time-invariant filter $H_{person}(\omega)$, or by the multiplicative distortion $H_{person}(\omega)$ being superimposed on the normalized voice spectrum $S^*(\omega;t)$.

$$S(\omega;t)=H_{person}(\omega) \cdot S^*(\omega;t) \quad (12)$$

In the actual environment such as in a car cabin, the multiplicative distortions are generally considered to include the following three kinds in addition to the individuality of a talker described above [A. Acero, "Acoustical and Environmental Robustness in Automatic Speech Recognition," Kluwer Academic Publishers, 1992].

(1) Speaking Style $H_{Style(N)}(\omega)$

This is a frequency transfer characteristic unique to the speaking style (the way a talker speaks, voice-uttering speed, voice level, and Lombarad effect) dependent on the additive noise N. The Lombard effect is a phenomenon in which under an environment where there is additive noise, a talker unconsciously changes his or her voice spectrum from the one produced under a quiet environment. In one literature [Y. Chen, "Cepstral Domain Talker Stress Compensation for Robust Speech Recognition," IEEE Trans. ASSP, Vol. 36, No. 4, pp. 433-439, 1988], it is pointed out that the soft way of speaking is characterized as producing a strong energy at frequencies below 1 kHz and a weak energy above 1 kHz whereas large voice, rapid speech, shout and Lombard effect have the opposite characteristic.

(2) Spatial Transfer Characteristic $H_{Trans}(\omega)$

This represents a spatial frequency transfer characteristic from a mouth to a microphone.

(3) Microphone Characteristic $H_{Mic}(\omega)$

This represents an electric frequency transfer characteristic of an input system such as microphone.

If an additive law holds in a linear spectrum domain of voice and noise, the observed spectrum $O(\omega;t)$ at time t and frequency $\omega$ can be modeled as $$O(\omega;t)=H_{Mic}(\omega) \cdot [H_{Trans}(\omega) \cdot \{H_{Style(N)}(\omega) \cdot (H_{Person}(\omega) \cdot S^*(\omega;t))\} + N(\omega;t) + E(\omega;t)] \quad (13)$$

[J. H. L. Hansen, B. D. Womack, and L. M. Arslan, "A Source Generator Based Production Model for Environmental Robustness in Speech Recognition," Proc. ICSLP 94, Yokohama, Japan, pp. 1003-1006, 1994]. Here $N(\omega;t)$ represents an additive noise spectrum with an unknown source and $E(\omega;t)$ represents an additive noise spectrum with a known source.

Of the four kinds of multiplicative distortions, $H_{Mic}(\omega)$ can be measured in advance but it is considered difficult to separate and measure $H_{Person}(\omega)$, $H_{Style(N)}(\omega)$ and $H_{Trans}(\omega)$ without burdening the user of the speech recognition system in a real use environment.

Even if the additive noise $N(\omega;t)$ and $E(\omega;t)$ do not exist, the above four kinds of multiplicative distortions will unavoidably enter the gain of the time-invariant filter which is determined as the long-term average of the observed spectra in a manner similar to equation (10). Now, let us define the multiplicative distortion $H^*(\omega)$ and the additive noise $\tilde{N}(\omega;t)$, $\tilde{E}(\omega;t)$ as follows:

$$H^*(\omega)=H_{Mic}(\omega) \cdot H_{Trans}(\omega) \cdot H_{Style(N)}(\omega) \cdot H_{person}(\omega) \quad (14)$$

$$\tilde{N}(\omega;t)=H_{Mic}(\omega) \cdot N(\omega;t) \quad (15)$$

$$\tilde{E}(\omega;t)=H_{Mic}(\omega) \cdot E(\omega;t) \quad (16)$$

then, equation (13) can be simplified as follows.

$$O(\omega;t)=H^*(\omega) \cdot S^*(\omega;t)+\tilde{N}(\omega;t)+\tilde{E}(\omega;t) \quad (17)$$

Transforming equation (17) results in $$S*(\omega; t) = \frac{O(\omega; t) - \tilde{N}(\omega; t) - \tilde{E}(\omega; t)}{H*(\omega)} \quad (18)$$

If a speaker independent phoneme model is generated in advance by using a spectrum normalized by equation (11), rather than an actually observed spectrum, it is considered possible to realize a robust speech recognition system by removing the $\tilde{N}(\omega;t)$, $\tilde{E}(\omega;t)$ and $H^*(\omega)$ in the real environment from the observed spectrum $O(\omega;t)$ to determine the estimated value of the normalized voice spectrum $S^*(\omega;t)$. As for the Ñ(ω;t), Ẽ(ω;t), it is pointed out earlier that the combination of the NLMS-VAD method and the CSS method has proved effective.

In the speech recognition system, a cepstrum rather than a spectrum is normally used as an acoustic parameter. The cepstrum is defined as the logarithm of a spectrum subjected to the discrete cosine transform (DCT). The cepstrum is often used because it can provide an equivalent speech recognition performance with fewer parameters than the spectrum.

For elimination of the multiplicative distortion H*(ω;t) from the normalized voice spectrum S*(ω;t), the following E-CMN (Exact Cepstrum Mean Normalization) method has been shown to be effective [M. Shozakai, S. Nakamura and K. Shikano, "A Non-Iterative Model-Adaptive E-CMN/PMC Approach for Speech Recognition in Car Environments," Proc. Eurospeech, Rhodes, Greece, pp. 287-290, 1997]. The E-CMN method consists of the following two steps.

Estimation step: A cepstrum mean is determined individually for the voice and non-speech frames for each person. When the cepstrum of an order i in frame t is expressed as c(i,t), then the cepstrum mean $\tilde{C}_{Speech}(i,t)$ can be obtained by equation (19), for example.

$$\tilde{C}_{Speech}(i,t) = \begin{cases} \eta \cdot \tilde{C}_{Speech}(i, t-1) + (1-\eta) \cdot c(i,t) & \text{if frame } t \text{ is speech} \\ \tilde{C}_{Speech}(i, t-1) & \text{otherwise} \end{cases} \quad (19)$$

where η is a smoothing coefficient used to determine the cepstrum mean of the speech frames and may be set smaller but close to 1.0. The cepstrum mean $\tilde{C}_{Nonspeech}(i,t)$ for the non-speech frame in the frame t can be determined by equation (20) for example. Here, η is a smoothing coefficient used to calculate the cepstrum means and needs to be set smaller than but close to 1.0.

$$\tilde{C}_{Nonspeech}(i,t) = \begin{cases} \eta \cdot \tilde{C}_{Nonspeech}(i, t-1) + (1-\eta) \cdot c(i,t) & \text{if frame is not speech} \\ \tilde{C}_{Nonspeech}(i, t-1) & \text{otherwise} \end{cases} \quad (20)$$

The cepstrum mean for the speech frame is a cepstrum expression of the multiplicative distortion H*(ω) and depends on a talker. The cepstrum mean for non-speech frames depends on the multiplicative distortion $H_{Mic}(\omega)$ of an input system such as microphone.

Normalization step: According to equation (21), the normalized cepstrum $\hat{C}(i,t)$ is obtained by subtracting from the observed cepstrum c(i,t) the speech frame cepstrum mean $\tilde{C}_{Speech}(i,t)$ in the speech frames and the non-speech frame cepstrum mean $\tilde{C}_{Nonspeech}(i,t)$ in the non-speech frames, thus normalizing the observed spectrum.

$$\hat{C}(i,t) = \begin{cases} C(i,t) - \tilde{C}_{Speech}(i,t) & \text{if frame } t \text{ is speech} \\ C(i,t) - \tilde{C}_{Nonspeech}(i,t-1) & \text{otherwise} \end{cases} \quad (21)$$

Regarding the E-CMN method, the applicant of the present invention has already filed a patent application with the Japanese Patent Office (Japanese Patent Application No. 09-056018, filed on Mar. 11, 1997).

The E-CMN method estimates from a small amount of speech consisting of about 10 words a product of various multiplicative distortions as a cepstrum mean for that speech duration and then subtracts the mean from an input cepstrum. It has been made clear that if a speaker independent phoneme model is generated in advance by using a cepstrum normalized by the E-CMN method rather than a cepstrum obtained from observed spectra, it is possible to compensate for various multiplicative distortions en mass.

Figure 12:
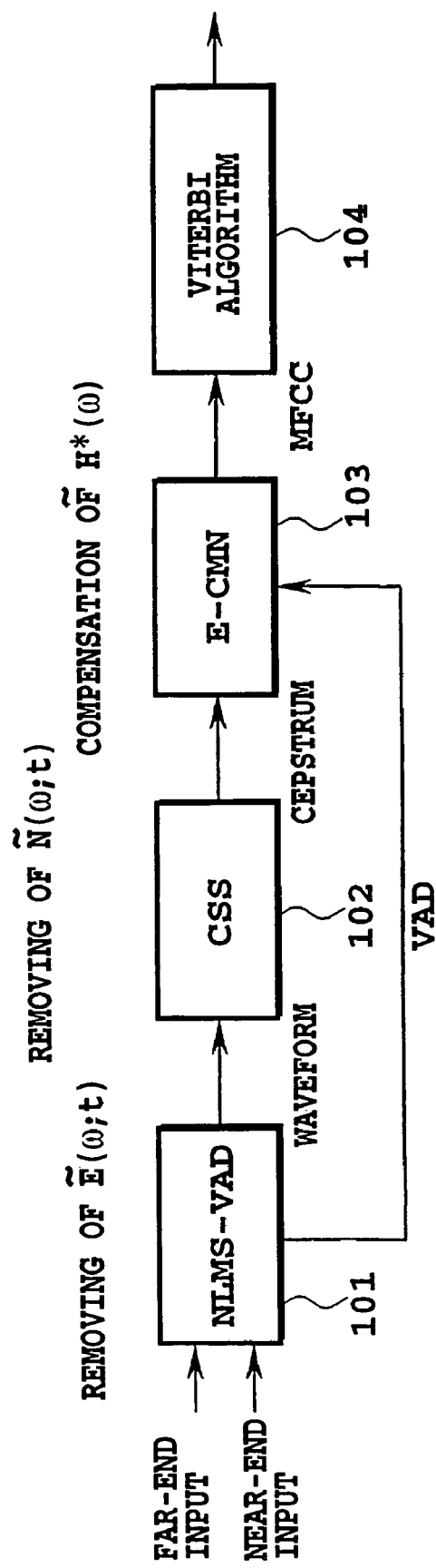
FIG. 12 is a block diagram showing the processing performed by NLMS-VAD/CCS/E-CMN methods with an abscissa representing time in seconds.

Lastly, as a robust speech recognition method for a real environment where there are additive noise with known and unknown sources and multiplicative distortions, a method of combining the NLMS-VAD method, the CSS method and the E-CMN method will be described. FIG. 12 shows a block diagram of a calculation circuit constructed in compliance with this combined method. A first circuit 101 generates a waveform signal according to the NLMS-VAD method by removing the additive noise E(ω;t) with a known source from the input voice. Next, a second circuit 102 performs a Fourier transform on this waveform signal and then, according to the CSS method, generates a time sequence of spectra that are removed of the additive noise of an unknown source Ñ(ω;t).

Further, a third circuit 103 converts the time sequence of spectra into a time sequence of normalized cepstra by the E-CMN method. Finally, a fourth circuit 104 checks, according to the known Viterbi algorithm, the time sequence of cepstra against the speaker independent phoneme model prepared in advance and then outputs the result of speech recognition.

The speaker independent phoneme model used in the above processing should be prepared in advance by using the cepstrums normalized by the E-CMN as described above. For the distinction between speech frame and non-speech frame required by the E-CMN method, the result of the VAD incorporated in the NLMS-VAD method can be used as is.

Next, the results of experiments using the combined method are summarized as follows. A unidirectional microphone was attached to a sun visor in front of the driver's seat in a 2000-cc car; two males and two females took their turn in sitting on the driver's seat adjusted to their desired position and uttering 520 words (ATR voice database C set). The voiced words (data 1) were recorded. Manual operation was performed so that voiceless durations of 250 ms were attached to both ends of each voiced duration. In three running conditions—idling, 60 km/h and 100 km/h—five kinds of music sources (pops, jazz, rock, classic and comic story) were played by a car audio system, and a signal (data 2) mixing the left and right channels of the music source and a microphone input signal (data 3) were recorded simultaneously as a pair of data. The output volume of the car audio system was set at a level such that a male driver felt comfortable hearing the music in each running condition.

In the running condition of idling, 60 km/h and 100 km/h, the maximum input levels of the acoustic echoes to the microphone were 60.7 dBA, 65.9 dBA and 70.6 dBA respectively. The data 1 and the data 3 were added together by computer to generate evaluation data. The data 2 was used as a far-end input for the NLMS-VAD method. Used for speech recognition was speaker independent 54-phonemes, context-independent Tied-Mixture HMM model (generated from speech data of 40 people). The analysis conditions are a sampling frequency of 8 kHz, a frame length of 32 ms, and a frame shift of 10 ms; the feature parameters are a 10th order MFCC, a 10-th order ΔMFCC, and a Δenergy; and the numbers of normal distributions shared by the HMM models are 256, 256 and 64 for each feature parameter respectively.

Figure 13:
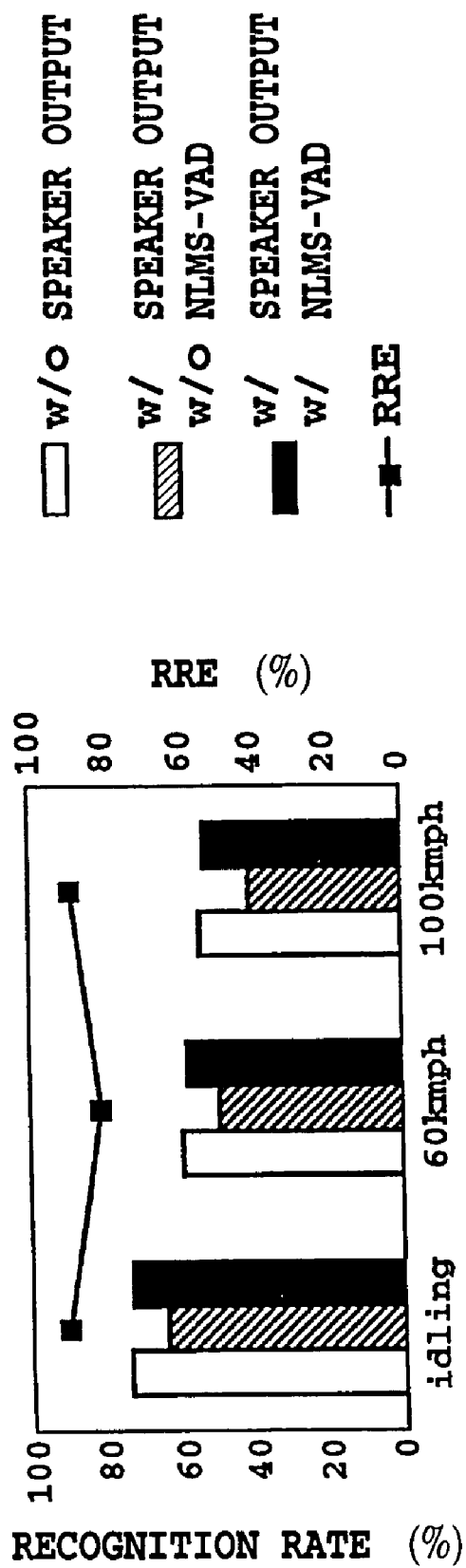
FIG. 13 is a graph showing evaluations of NLMS-VAD/CSS/E-CMN methods.

FIG. 13 shows the recognition performance (average for the five kinds of music sources) in the task of recognizing speaker independent 520 words in the running conditions of idling, 60 km/h and 100 km/h for the following three cases: 1) there is no sound output from a speaker (w/o Speaker Out); 2) there is speaker output sound but the NLMS-VAD method is not performed (w/ Speaker Out w/o NLMS-VAD); and 3) there is speaker output sound and the NLMS-VAD method is performed (w/ Speaker Out w/ NLMS-VAD).

In either running condition the RREs obtained were more than 80%. The erroneous recognition rates for the speech that could not be recovered even by the NLMS-VAD method were very low at 0.7%, 2.1% and 1.8% for the running conditions of idling, 60 km/h and 100 km/h respectively. This verifies the effectiveness of the combined method.

First Embodiment

Figure 14:
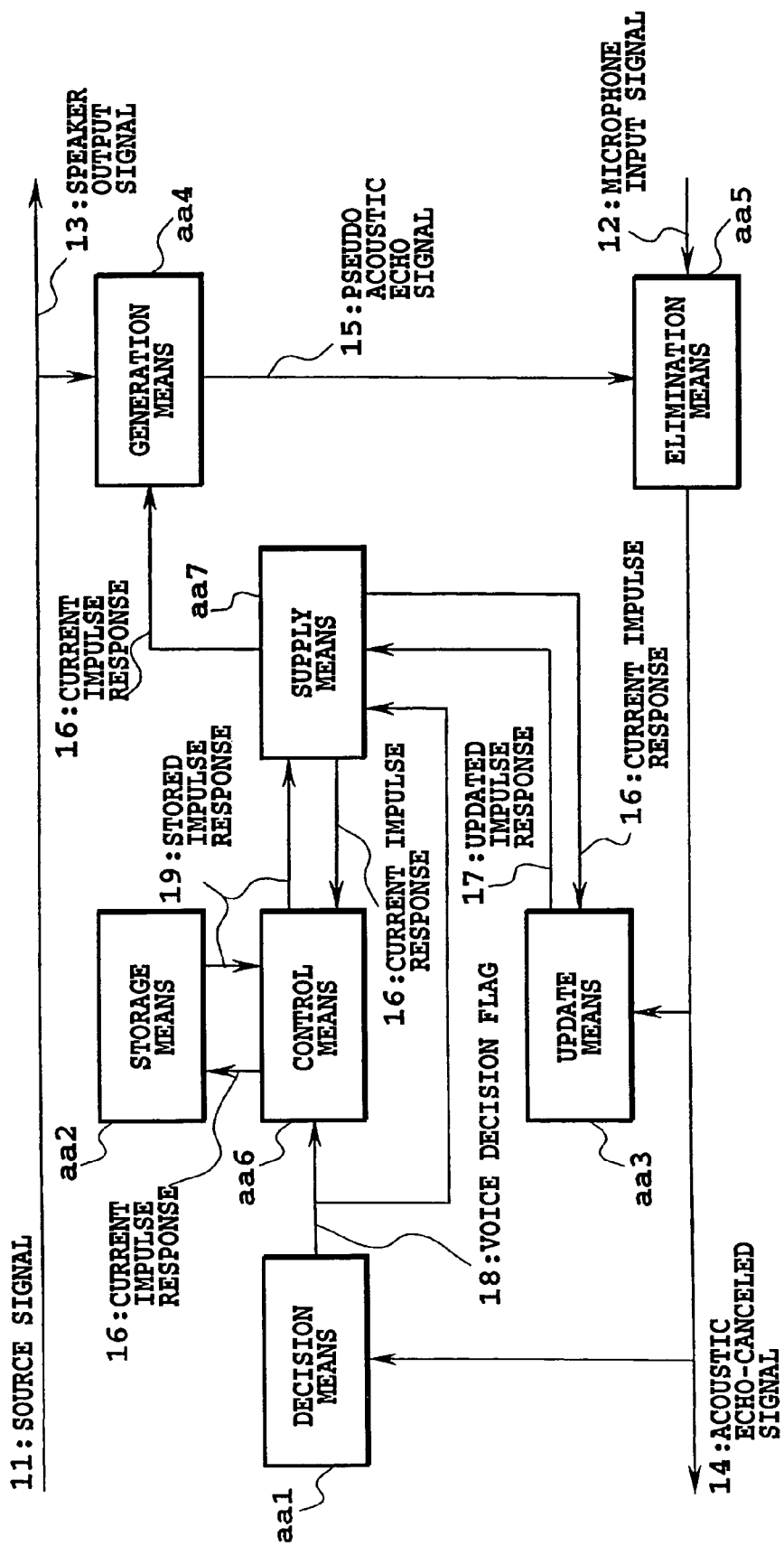
FIG. 14 is a block diagram showing a configuration of a speech processing apparatus according to a first embodiment of the present invention.

A circuit configuration of the speech processing apparatus according to the first embodiment is shown in FIG. 14. Individual means described below may use known circuits, such as digital circuits and other circuits that can be realized by calculation processing of computer and digital processor. So, a person skilled in the art should be able to manufacture the speech processing apparatus according to FIG. 13. First, the processing performed on each sample will be explained. A source signal 11 is output from the speaker as a speaker output signal 13. A supply means aa7 holds a current impulse response (coefficient of the FIR filter) and supplies the current impulse response 16 to a generation means aa4.

The source signal 11 is sent to the generation means aa4 where it is transformed into a pseudo acoustic echo signal 15 by the FIR filter. In an elimination means aa5, the pseudo acoustic echo signal 15 is subtracted from a microphone input signal 12 to generate an acoustic echo-canceled signal 14. An update means aa3 updates the impulse response based on the source signal 11, the acoustic echo-canceled signal 14 and the current impulse response 16 held in the supply means aa7 and then feeds the updated impulse response 17 to the supply means aa7.

The supply means aa7 retains the updated impulse response 17 supplied from the update means aa3 as a new current impulse response only when a voice decision flag 18 described later is OFF. When the voice decision flag 18 is ON, the supply means aa7 discards the updated impulse response 17 sent from the update means aa3. The acoustic echo-canceled signal 14 generated by the elimination means aa5 is also sent to a decision means aa1.

Next, the processing performed on each frame is explained. The acoustic echo-canceled signal 14 sent to the decision means aa1 for every sample is saved in a buffer. When one frame of samples has accumulated, the decision means aa1 checks if there is a voice in a microphone input means (not shown) and issues the voice decision flag 18. When the decision is positive (the presence of a voice is detected), the value of the voice decision flag is said to be ON. When the decision is negative (the presence of a voice is not detected), the value of the voice decision flag is said to be OFF.

This decision processing checks whether a voice signal is included in the microphone input signal 12 by using the time domain and frequency domain information on the acoustic echo-canceled signal 14. The decision may appropriately use an algorithm called VAD (Voice Activity Detection) that can detect a voice superimposed on additive noise of an unknown source. According to the Recommendation GSM 06.32, voice detection is made by comparing the residual energy of the signal after LPC analysis with a threshold value. Because of its ability to change the threshold value according to the energy level of the additive noise of an unknown source, the VAD can isolate the voice from the additive noise of an unknown source.

The adaptation of the threshold value is done by using the stationarity (frequency domain information) and the pitch feature (time domain information) of a spectrum. When the above decision process decides that the voice decision flag 18 is OFF, a control means aa6 retrieves the current impulse response 16 from the supply means aa7 and stores it as a desired impulse response in a storage means aa2.

When the voice decision flag 18 is ON, there is a possibility of the impulse response held in the supply means aa7 having deviated from a desired value, so that the control means aa6 retrieves one of the impulse responses stored in the storage means aa2 and overwrites the impulse response held in the supply means aa7 with the retrieved one. The storage means aa2 needs only to be an FIFO capable of storing one or more impulse responses.

Second Embodiment

Figure 15:
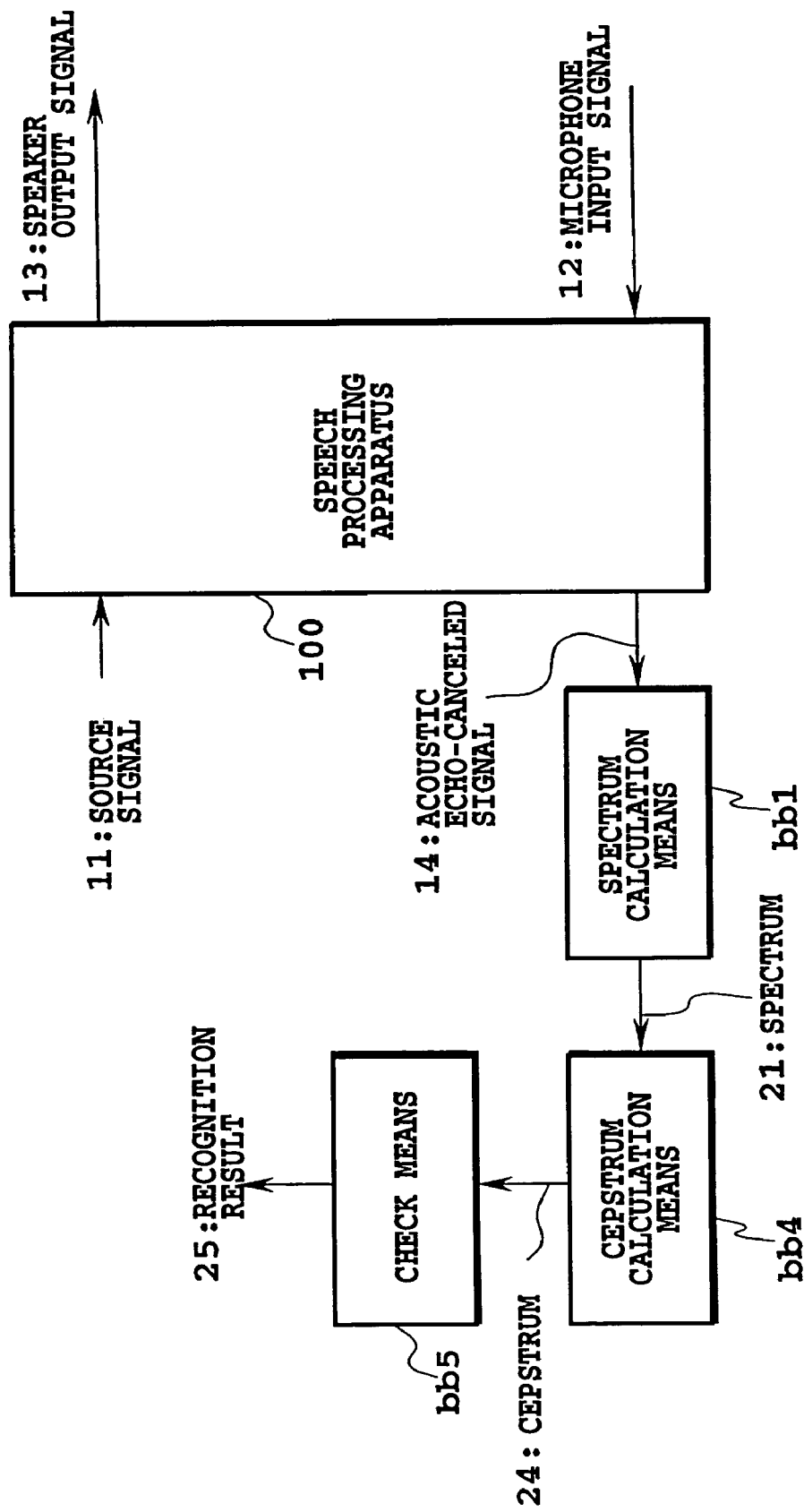
FIG. 15 is a block diagram showing a configuration of a system according to a second embodiment of the present invention.

FIG. 15 shows the basic configuration of the second embodiment. A speech processing apparatus 100 having the configuration of FIG. 14 explained in the first embodiment uses the source signal 11 and the microphone input signal 12 to cancel acoustic echoes contained in the microphone input signal 12 to generate an acoustic echo-canceled signal 14. Then, a spectrum calculation means bb1 calculates a spectrum 21 of the acoustic echo-canceled signal 14 by performing the Fourier transform every predetermined number of frame period.

The spectrum 21 is sent to a cepstrum calculation means bb4 where it is converted into a cepstrum 24 for each predetermined number of frames. A check means bb5 performs a check by using the cepstrum 24 for each predetermined number of frames and outputs a recognition result 25. The check process may use a technique based on either the known hidden Morkov model, the known dynamic programming method or the known neural network method.

Third Embodiment

Figure 16:
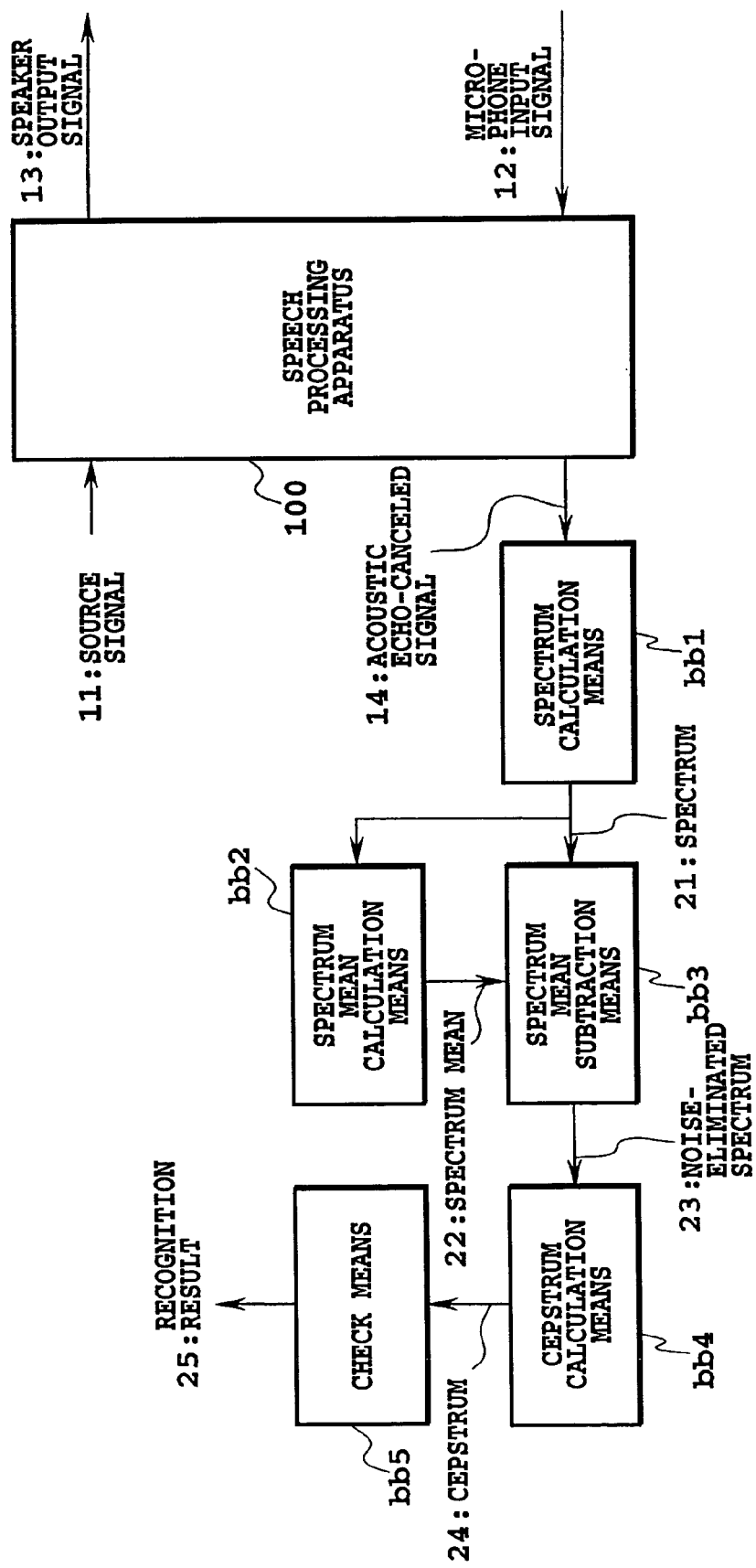
FIG. 16 is a block diagram showing a configuration of a system according to a third embodiment of the present invention.

FIG. 16 shows the basic configuration of the third embodiment. Components identical with those of the second embodiment in FIG. 15 are assigned like reference numbers. A speech processing apparatus 100 having the configuration of FIG. 14 uses the source signal 11 and the microphone input signal 12 to cancel acoustic echoes contained in the microphone input signal 12 to generate an acoustic echo-canceled signal 14. Then, a spectrum calculation means bb1 calculates a spectrum 21 of the acoustic echo-canceled signal 14 by performing the Fourier transform every predetermined number of frame period. The spectrum 21 is sent to a spectrum mean calculation means bb2 which, according to equation (8), determines a spectrum mean 22 for each predetermined number of frames.

The spectrum 21 calculated by the spectrum calculation means bb1 is sent to a spectrum mean subtraction means bb3 where the spectrum mean 22 is subtracted from the spectrum 21 according to equation (9) to obtain a noise-removed spectrum 23. The noise-removed spectrum 23 is fed to a cepstrum calculation means bb4 where it is transformed into a cepstrum 24 for each predetermined number of frames. A check means bb5 uses the cepstrum 24 for each predetermined number of frames to perform checking and then outputs a recognition result 25. The check process may use a technique based on either the known hidden Morkov model, the known dynamic programming method or the known neural network method.

Fourth Embodiment

Figure 17:
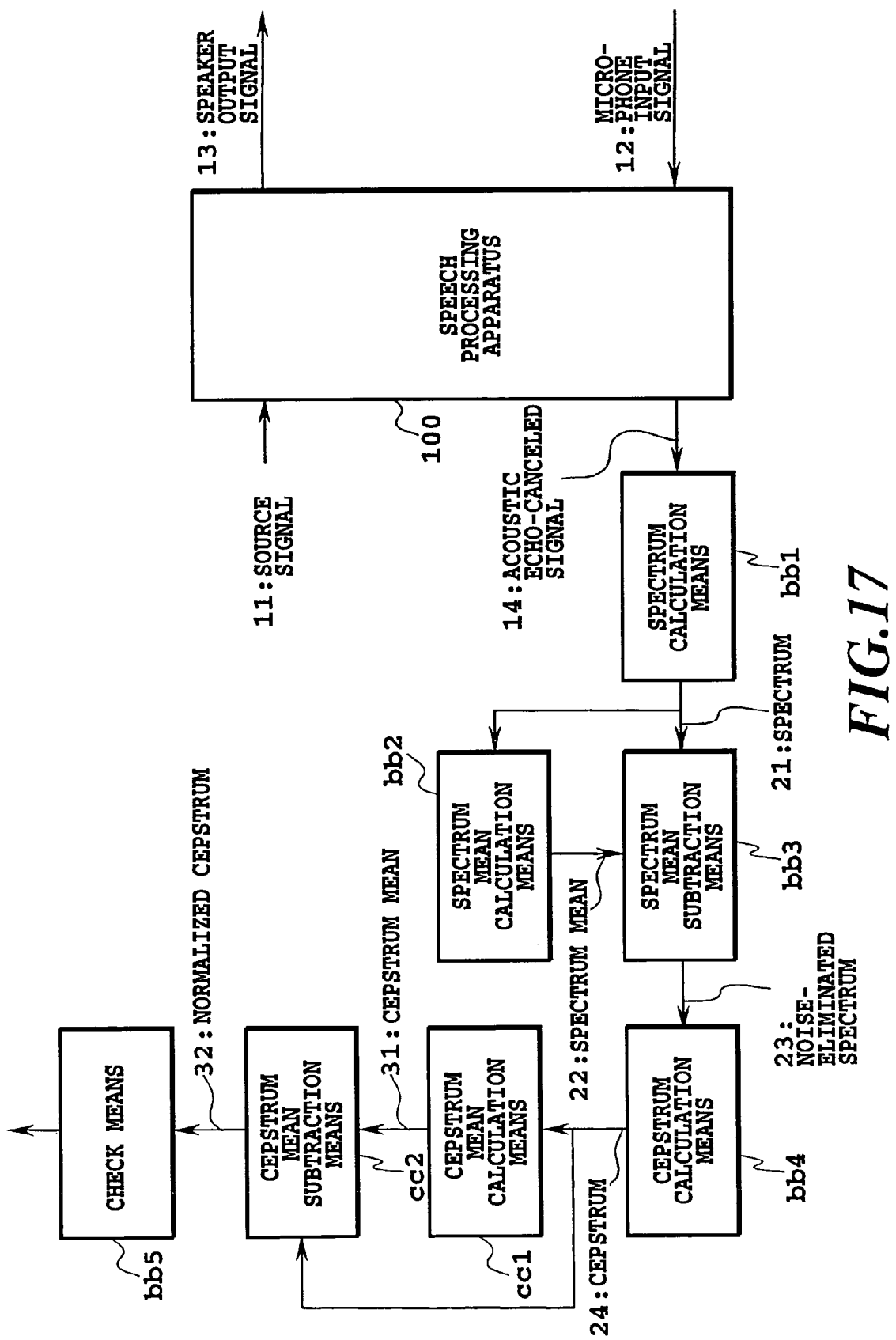
FIG. 17 is a block diagram showing a configuration of a system according to a fourth embodiment of the present invention.

FIG. 17 shows the basic configuration of the fourth embodiment. In FIG. 17 components identical with those of the second or third embodiment are assigned like reference numbers. A speech processing apparatus 100 having the configuration of FIG. 14 uses the source signal 11 and the microphone input signal 12 to cancel acoustic echoes contained in the microphone input signal 12 to generate an acoustic echo-canceled signal 14. Then, a spectrum calculation means bb1 calculates a spectrum 21 of the acoustic echo-canceled signal 14 by performing the Fourier transform every predetermined number of frame period. The spectrum 21 is sent to a spectrum mean calculation means bb2 which, according to equation (8), determines a spectrum mean 22 for each predetermined number of frames.

The spectrum 21 calculated by the spectrum calculation means bb1 is sent to a spectrum mean subtraction means bb3 where the spectrum mean 22 is subtracted from the spectrum 21 according to equation (9) to obtain a noise-removed spectrum 23. The noise-removed spectrum 23 is fed to a cepstrum calculation means bb4 where it is transformed into a cepstrum 24 for each predetermined number of frames.

The cepstrum 24 is sent to a cepstrum mean calculation means cc1 which determines a cepstrum mean 31. The calculation of the cepstrum may use equation (19) and equation (20), for example. Next, a cepstrum mean subtraction means cc2 subtracts the cepstrum mean 31 from the cepstrum 24 to obtain a normalized cepstrum 32. The subtraction may use equation (21). A check means bb5 uses the normalized cepstrum 32 for each predetermined number of frames to perform checking and outputs a recognition result 25.

The check process may use a technique based on either the known hidden Morkov model, the known dynamic programming method or the known neural network method.

Fifth Embodiment

Figure 18:
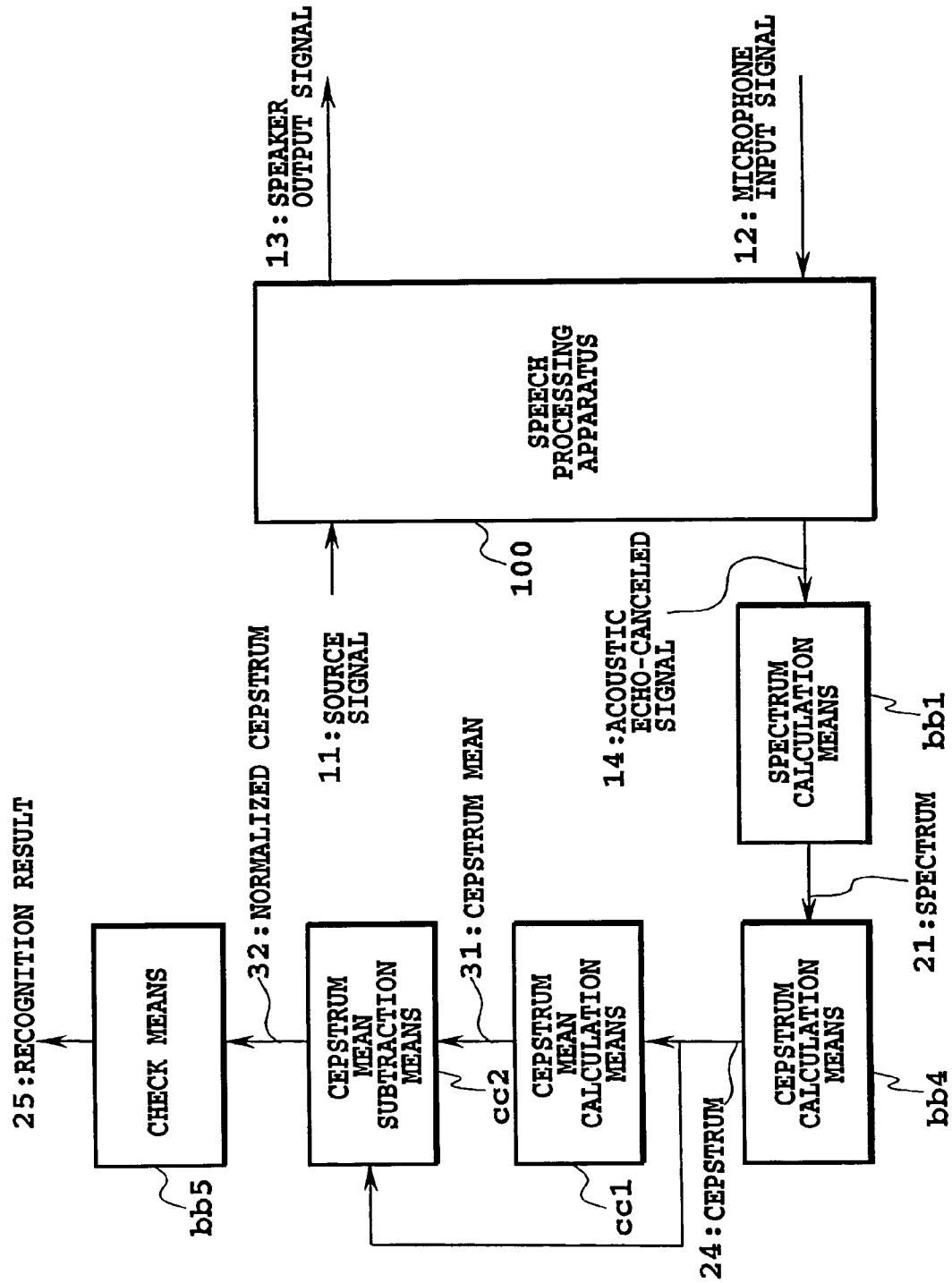
FIG. 18 is a block diagram showing a configuration of a system according to a fifth embodiment of the present invention.

FIG. 18 shows the basic configuration of the fifth embodiment. In FIG. 18 components identical with those of the second, third or fourth embodiment are assigned like reference numbers. A speech processing apparatus 100 having the configuration of FIG. 14 uses the source signal 11 and the microphone input signal 12 to cancel acoustic echoes contained in the microphone input signal 12 to generate an acoustic echo-canceled signal 14. Then, a spectrum calculation means bb1 calculates a spectrum 21 of the acoustic echo-canceled signal 14 by performing the Fourier transform every predetermined number of frame period. The spectrum 21 is sent to a cepstrum calculation means bb4 where it is converted into a cepstrum 24 for each predetermined number of frames. The cepstrum 24 is sent to a cepstrum mean calculation means cc1 which calculates a cepstrum mean 31. The calculation of the cepstrum mean may use equation (19) and (20).

Then a cepstrum mean subtraction means cc2 subtracts the cepstrum mean 31 from the cepstrum 24 to obtain a normalized cepstrum 32. The subtraction may use equation (21). A check means bb5 uses the normalized cepstrum 32 for each predetermined number of frames to perform checking and then outputs a recognition result 25. The check process may use a technique based on either the known hidden Morkov model, the known dynamic programming method or the known neural network method.

Sixth Embodiment

Figure 19:
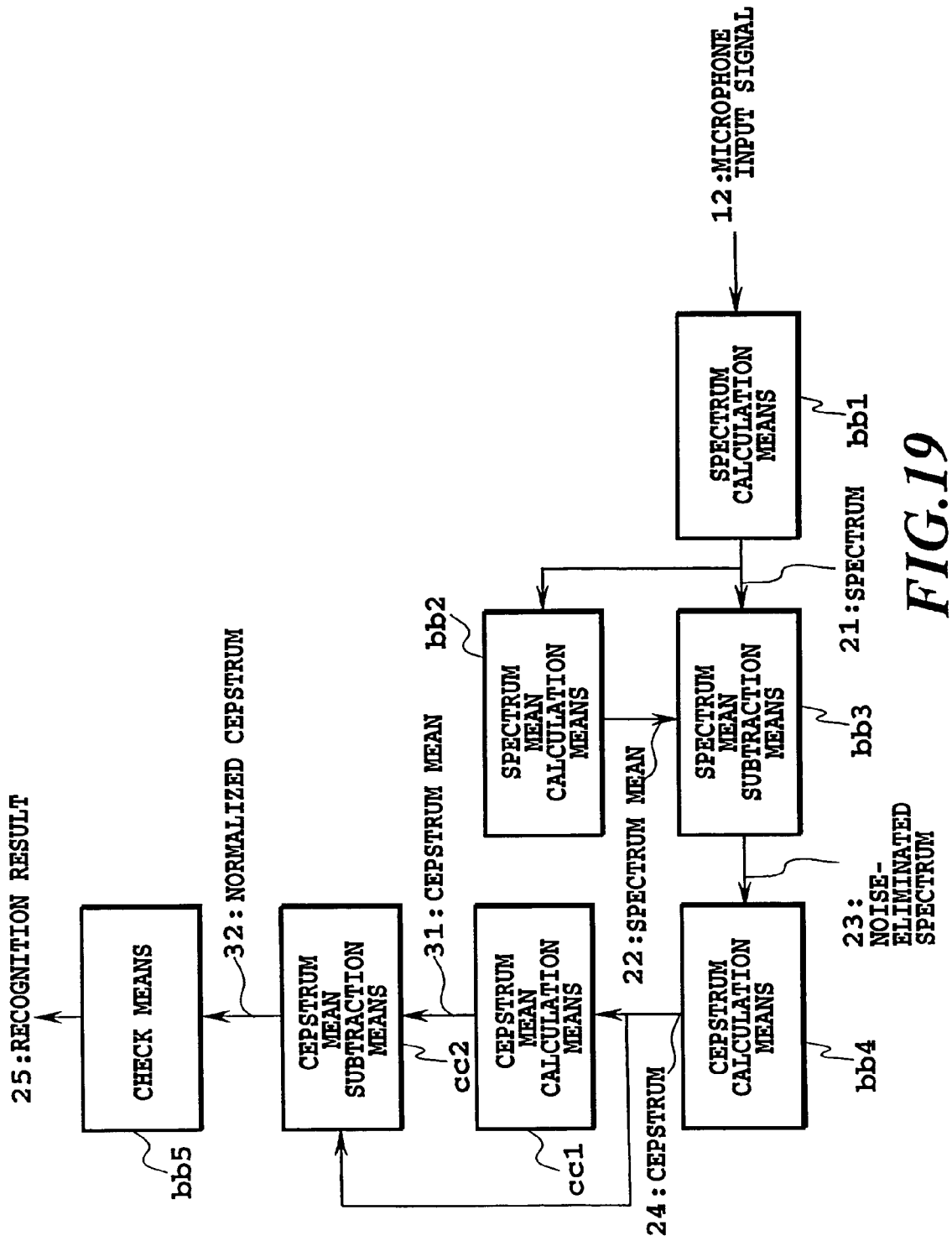
FIG. 19 is a block diagram showing a configuration of a system according to a sixth embodiment of the present invention.

FIG. 19 shows the basic configuration of the sixth embodiment. In FIG. 16 components identical with those of the second, third, fourth or fifth embodiment are assigned like reference numbers. A speech processing apparatus 100 having the configuration of FIG. 14 uses the source signal 11 and the microphone input signal 12 to cancel acoustic echoes contained in the microphone input signal 12 to generate an acoustic echo-canceled signal 14. Then, a spectrum calculation means bb1 calculates a spectrum 21 of the acoustic echo-canceled signal 14 by performing the Fourier transform every predetermined number of frame period. The spectrum 21 is sent to a cepstrum calculation means bb4 where it is converted into a cepstrum 24 for each predetermined number of frames.

The cepstrum 24 is sent to a cepstrum mean calculation means cc1 which calculates a cepstrum mean 31. The calculation of the cepstrum mean may use equation (19) and (20). Then a cepstrum mean subtraction means cc2 subtracts the cepstrum mean 31 from the cepstrum 24 to obtain a normalized cepstrum 32. The subtraction may use equation (21). A check means bb5 uses the normalized cepstrum 32 for each predetermined number of frames to perform checking and then outputs a recognition result 25. The check process may use a technique based on either the known hidden Morkov model, the known dynamic programming method or the known neural network method.

What is claimed is:

1. A speech processing apparatus which recognizes speech of a person in a car, comprising:

generation means for generating a pseudo acoustic echo signal for each sample, said samples being based on a current impulse response simulating an acoustic echo transfer path and on a source signal;

supply means for holding the current impulse response for each sample and supplying the current impulse response to said generation means;

elimination means for subtracting said pseudo acoustic echo signal from a near-end speech signal to remove an acoustic echo component and thereby generate an acoustic signal which has been echo-canceled for each sample;

update means for continually updating the impulse response for each sample by using said source signal, said acoustic echo-canceled signal and the current impulse response held by said supply means and for supplying the updated impulse response to said supply means;

decision means for checking in each frame, said frames being comprised of plurality of samples, whether or not a voice is included in the near-end speech signal, by using time domain information and frequency domain information of said acoustic signal after said acoustic signal has been echo-canceled, said decision means outputting a result indicating whether said voice is included in the near-end speech signal;

storage means for storing one or more impulse responses in each frame;

control means for, in a frame for which the result of decision made by said decision means is negative, storing in said storage means the current impulse response held by said supply means and, in a frame for which the result of the decision is positive, retrieving one of the impulse responses stored in said storage means and supplying the one of the impulse responses to said supply means;

means for determining a spectrum for each frame by performing the Fourier transform on said acoustic echo-canceled signal;
means for successively determining a spectrum mean for each frame based on the spectrum obtained; and
means for successively subtracting the spectrum mean from the spectrum calculated for each frame from said acoustic echo-canceled signal to remove additive noise of an unknown source,
wherein said source signal is an output signal of a speaker of said speech processing apparatus in the car, said acoustic echo transfer path is a path from the output signal of the speaker of said speech processing apparatus in the car to an input signal of a microphone of said speech processing apparatus in the car, said near-end speech signal is a signal of the speech of the person in the car and said additive noise of an unknown source is the car's noise with energy level of between 60 dBA and 80 dBA.

2. A speech processing apparatus as claimed in claim 1, wherein said acoustic echo-canceled signal is used for speech recognition.

3. A speech processing apparatus as claimed in claim 1, further comprising:
means for determining a cepstrum from the spectrum, the spectrum having the additive noise of an unknown source removed by said subtraction means;
means for determining for each talker a cepstrum mean of a speech frame and a cepstrum mean of a non-speech frame, separately, from the cepstrums obtained; and
means for subtracting the cepstrum mean of the speech frame of each talker from the cepstrum of the speech frame of the talker and for subtracting the cepstrum mean of the non-speech frame of each talker from the cepstrum of the non-speech frame of the talker to correct in a lump multiplicative distortions that are dependent on microphone characteristics and spatial transfer characteristics from the mouth of the talker to the microphone, wherein said means for subtracting comprises first subtracting means for subtracting the cepstrum mean of the speech frame of each talker from the cepstrum of the speech frame of each talker and second means for subtracting the cepstrum mean of the non-speech frame of the talker and by said first subtracting means and said second subtracting means, said subtracting means corrects in a lump multiplicative distortions that are dependent on a microphone characteristics and spatial transfer characteristics from the mouth of the talker to the microphone.

4. A speech processing apparatus as claimed in claim 1, further comprising:
means for determining a cepstrum from the spectrum obtained; means for determining for each talker a cepstrum mean of a speech frame and a cepstrum mean of a non-speech frame, separately, from the cepstrums obtained; and
means for subtracting the cepstrum mean of the speech frame of each talker from the cepstrum of the speech frame of the talker and for subtracting the cepstrum mean of the non-speech frame of each talker from the cepstrum of the non-speech frame of the talker to correct multiplicative distortions that are dependent on microphone characteristics and spatial transfer characteristics from the mouth of the talker to the microphone.

5. A speech processing method of a speech processing apparatus which recognizes a speech of a person in a car, comprising:

a generation step for generating a pseudo acoustic echo signal for each sample, said samples being based on a current impulse response simulating an acoustic echo transfer path and on a source signal;
a supply step for holding the current impulse response for each sample and supplying the current impulse response to said generation step;
an elimination step for subtracting said pseudo acoustic echo signal from a near-end speech signal to remove an acoustic echo component and thereby generate an acoustic signal which has been echo-canceled for each sample;
an update step for continually updating the impulse response for each sample by using said source signal, said acoustic echo-canceled signal and the current impulse response held by the supply step and for supplying the updated impulse response to said supply step;
a decision step for checking in each frame, said frames being comprised of plurality of samples, whether or not a voice is included in the near-end speech signal, by using time domain information and frequency domain information of said acoustic signal after said acoustic signal has been echo-canceled, said decision step outputting a result indicating whether said voice is included in the near-end speech signal;
a storage step for storing one or more impulse responses in each frame;
a control step for, in a frame for which the result of decision made by said decision step is negative, storing in said storage step the current impulse response held by the supply step and, in a frame for which the result of decision is positive, retrieving one of the impulse responses stored in said storage step and supplying it to said supply step;
a step for determining a spectrum for each frame by performing the Fourier transform on said acoustic echo-canceled signal;
a step for successively determining a spectrum mean for each frame based on the spectrum obtained; and
a step for successively subtracting the spectrum mean from the spectrum calculated for each frame from said acoustic echo-canceled signal to remove additive noise of an unknown source,
wherein said source signal is an output signal of a speaker of said speech processing apparatus in the car, said acoustic echo transfer path is a path from the output signal of the speaker of said speech processing apparatus in the car to an input signal of a microphone of said speech processing apparatus in the car, said near-end speech signal is a signal of the speech of the person in the car and said additive noise of an unknown source is the car's noise with energy level of between 60 dBA and 80 dBA.

6. A speech processing method as claimed in claim 5, wherein said acoustic echo-canceled signal is used for speech recognition.

7. A speech processing method as claimed in claim 5, further comprising:
a step for determining a cepstrum from the spectrum removed of the additive noise;
a step for determining for each talker a cepstrum mean of a speech frame and a cepstrum mean of a non-speech frame, separately, from the cepstrums obtained; and
a step for subtracting the cepstrum mean of the speech frame of each talker from the cepstrum of the speech frame of the talker and for subtracting the cepstrum mean of the non-speech frame of each talker from the cepstrum of the non-speech frame of the talker to correct multiplicative distortions that are dependent on microphone characteristics and spatial transfer characteristics from the mouth of the talker to the microphone.

8. A speech processing method as claimed in claim 5, further comprising:
   a step for determining a cepstrum from the spectrum obtained; a step for determining for each talker a cepstrum mean of a speech frame and a cepstrum mean of a non-speech frame, separately, from the cepstrums obtained; and
   a step for subtracting the cepstrum mean of the speech frame of each talker from the cepstrum of the speech frame of the talker and for subtracting the cepstrum mean of the non-speech frame of each talker from the cepstrum of the non-speech frame of the talker to correct multiplicative distortions that are dependent on microphone characteristics and spatial transfer characteristics from the mouth of the talker to the microphone.

\* \* \* \* \*